United States Patent
Tsuboi et al.

(10) Patent No.: US 8,599,750 B2
(45) Date of Patent: Dec. 3, 2013

(54) BASE STATION DEVICE, MOBILE STATION DEVICE, COMMUNICATION SYSTEM, COMMUNICATION METHOD, AND COMMUNICATION PROGRAM

(75) Inventors: Hidekazu Tsuboi, Osaka (JP); Katsunari Uemura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 96 days.

(21) Appl. No.: 12/865,038

(22) PCT Filed: Jan. 26, 2009

(86) PCT No.: PCT/JP2009/051207
§ 371 (c)(1), (2), (4) Date: Jul. 28, 2010

(87) PCT Pub. No.: WO2009/096364
PCT Pub. Date: Aug. 6, 2009

(65) Prior Publication Data
US 2010/0329189 A1   Dec. 30, 2010

(30) Foreign Application Priority Data
Jan. 31, 2008   (JP) .................. P2008-020878

(51) Int. Cl.
*H04W 4/00* (2009.01)
(52) U.S. Cl.
USPC ............ 370/328; 370/310; 370/331; 370/329
(58) Field of Classification Search
None
See application file for complete search history.

(56) References Cited

U.S. PATENT DOCUMENTS

| | | | |
|---|---|---|---|
| 5,396,541 A | 3/1995 | Farwell et al. | |
| 2006/0003767 A1* | 1/2006 | Kim et al. | 455/436 |
| 2006/0153151 A1 | 7/2006 | Huang et al. | |
| 2006/0172707 A1 | 8/2006 | Stern-Berkowitz et al. | |
| 2006/0280204 A1 | 12/2006 | Nagata et al. | |
| 2009/0005049 A1 | 1/2009 | Nishio et al. | |
| 2009/0161587 A1* | 6/2009 | Ishii et al. | 370/311 |
| 2009/0262015 A1* | 10/2009 | Kim et al. | 342/357.09 |
| 2009/0323642 A1 | 12/2009 | Tanno et al. | |

FOREIGN PATENT DOCUMENTS

| | | |
|---|---|---|
| JP | 6-209491 A | 7/1994 |
| JP | 3883562 B2 | 2/2007 |
| JP | 2007-221743 A | 8/2007 |
| WO | WO 01/03458 A1 | 1/2001 |
| WO | WO 2006/080506 A1 | 8/2006 |

OTHER PUBLICATIONS

3GPP TS 36.211, V1.1.0, (May 2007), Physical channels and Modulation., Release 8.
3GPP TSG-RAN WG1 Meeting # 51, R1-075060, Jeju, Korea, Nov. 5-9, 2007.
Keiji Tachikawa, "W-CDMA mobile communication systems", ISBN4-621-04894-5, issued Jun. 25, 2001, Maruzen Co., Ltd.
European Search Report issued in European Patent Application No. 09705219.5 on Apr. 20, 2012.

* cited by examiner

*Primary Examiner* — Anez Ebrahim
(74) *Attorney, Agent, or Firm* — Birch, Stewart, Kolasch & Birch, LLP

(57) ABSTRACT

A synchronization channel control unit halts generation of a synchronization channel signal. A signal control unit halts generation of signals other than the synchronization channel signal after the synchronization channel control unit halts generation of the synchronization channel signal.

20 Claims, 14 Drawing Sheets

BASE STATION DEVICE, MOBILE STATION DEVICE, COMMUNICATION SYSTEM, COMMUNICATION METHOD, AND COMMUNICATION PROGRAM

TECHNICAL FIELD

The present invention relates to a base station device, a mobile station device, a communication system, a communication method, and a communication program.

This application claims priority to and the benefits of Japanese Patent Application No. 2008-020878 filed on Jan. 31, 2008, the disclosure of which is incorporated herein by reference.

BACKGROUND ART

In recent years, as some techniques considered for fourth-generation mobile communication systems have been introduced to third-generation mobile communication systems, evolved universal terrestrial radio access (hereinafter, referred to as EUTRA) aiming at high-speed communication has been considered by a standardization group, the 3rd Generation Partnership Project (3GPP) (Non-Patent Document 1).

In EUTRA, an orthogonal frequency division multiplexing access (OFDMA) scheme that is strong against multi-path interference and suitable for high-speed transmission is employed as a communication scheme. Further, specifications for an upper layer operation called data transmission control or resource management control for the EUTRA includes low latency and low overhead, and simplified technology is being employed.

In a communication system that realizes such enhanced communication technology, the load of a base station device increases, and an administrator of the base station device must halt the base station device for repair, maintenance, and management tasks. Further, since cell IDs, which are finite identifiers of base station devices, are used by a number of base station devices, the same cell ID may be used by different base station devices. Accordingly, the cell ID must be changed. Similarly, it is necessary to change information for synchronizing communication between the base station device and the mobile station device.

Here, in a cellular mobile communication scheme, a mobile station device uses a cell ID or information for communication synchronization to communicate with the base station device (Non-Patent Documents 1 and 2). Accordingly, when the base station device is halted or base station device information such as the cell ID is changed, communication disconnection or handover failure occurs in the mobile station device. In Non-Patent Document 3, an administrator of a base station device waits until a time zone in which a communication amount between the base station device and a mobile station device is reduced, and halts transmission and reception during the time zone to halt the base station device or change base station device information such as a cell ID.

Non-Patent Document 1: Keiji Tachikawa, "W-CDMA mobile communication systems," ISBN4-621-04894-5, issued Jun. 25, 2001, Maruzen Co., Ltd Non-Patent Document 2: 3GPP TR (Technical Report) 36.211, Physical channels and Modulation. V1.1.0, [searched on May 25, 2007], Internet (URL: http://www.3gpp.orgatp/Specs/html-info/36211.htm)

Non-Patent Document 3: 3GPP contribution R1-075060, "Response to LS on Physical-layer Cell Identity Collision," [searched on Nov. 13, 2007], Internet (URL: ftp://ftp.3gpp.org/TSG-RAN/WG1-RL1/TSGR 1_51/Docs/R1-075060.zip)

DISCLOSURE OF INVENTION

Problem to be Solved by the Invention

However, when a base station device needs to be halted for unexpected reasons such as failure of the base station device or when a limited working time or working efficiency is considered in changing base station information, an administrator of the base station device must halt the base station device or change the base station device information during a time zone other than a time zone in which a communication amount with the mobile station device is small. When the base station device is halted or the base station device information is changed during the time zone other than the time zone in which the communication amount with the mobile station device is small, communication disconnection, handover failure and so on may occur in the mobile station device communicating with the base station and the communication with the mobile station device may be greatly affected.

The present invention has been achieved in view of the above circumstances, and it is an object of the present invention to provide a base station device, a mobile station device, a communication system, a communication method, and a communication program capable of halting the base station device or changing the information of the base station device without greatly affecting communication with the mobile station device.

Means for Solving the Problem (1) The present invention has been made to solve the above-described problem. According to an aspect of the present invention, there is provided a base station device which transmits a synchronization channel signal to a mobile station device, the base station device including: a synchronization channel control unit which halts generation of the synchronization channel signal; and a signal control unit which halts generation of signals other than the synchronization channel signal after the synchronization channel control unit halts generation of the synchronization channel signal.

According to the above configuration, the base station device does not generate communication with a new mobile station device by halting generation of the synchronization channel signal. Accordingly, it is possible to halt the base station device without greatly affecting the communication with the mobile station device.

(2) According to an aspect of the present invention, the synchronization channel control unit halts generation of a signal of a slot or sub-frame including the synchronization channel signal.

According to the above configuration, it is possible to prevent the mobile station device performing propagation channel compensation on a signal of a slot or sub-frame including the synchronization channel signal based on the synchronization channel signal from erroneously propagation channel compensating the slot or sub-frame signal.

(3) According to an aspect of the present invention, the synchronization channel signal includes a first synchronization channel signal determined for each area of a cell, and a second synchronization channel signal for specifying information of the base station device, and the synchronization channel control unit halts generation of the first synchronization channel signal or both the first synchronization channel signal and the second synchronization channel signal.

(4) According to an aspect of the present invention, the synchronization channel control unit decreases transmission power of the synchronization channel signal in a stepwise fashion to halt the generation of the synchronization channel signal.

(5) According to an aspect of the present invention, there is provided a base station device which transmits a synchronization channel signal to a mobile station device, the base station device including: a synchronization channel control unit which halts generation of the synchronization channel signal; a network control unit which changes pre-stored information of the synchronization channel; and a change-scheduled information notification unit which notifies the mobile station device in communication of the synchronization channel signal information changed by the network control unit and a change time.

According to the above configuration, the base station device does not generate communication with a new mobile station device by halting generation of the synchronization channel signal. Accordingly, it is possible to change the base station device information without greatly affecting the communication with the mobile station device.

(6) According to an aspect of the present invention, there is provided a mobile station device which receives a synchronization channel signal from a base station device, the mobile station device including: a storage unit which stores information of the base station device; and a communication destination changing unit which changes the base station device information stored in the storage unit at the change time based on information of the synchronization channel signal, when a change-scheduled synchronization channel signal and a time are notified of by the base station device.

(7) According to an aspect of the present invention, there is provided a communication system in which a synchronization channel signal is transmitted from a base station device to a mobile station device, the base station device including: a synchronization channel control unit which halts generation of the synchronization channel signal; and a signal control unit which halts generation of signals other than the synchronization channel signal after the synchronization channel control unit halts generation of the synchronization channel signal.

(8) According to an aspect of the present invention, there is provided a communication system in which a synchronization channel signal is transmitted from a base station device to a mobile station device, wherein a first base station device includes: a storage unit which stores identification information of a base station device making a registration request based on the registration request; and a communication destination selection unit which selects identification information of a base station device to which the mobile station device is handed over, excluding the identification information of the base station device stored in the storage unit, and notifies the mobile station device of the selected identification information, and a second base station device includes: a synchronization channel control unit which halts generation of the synchronization channel signal; a signal control unit which halts generation of signals other than the synchronization channel signal after the synchronization channel control unit halts generation of the synchronization channel signal; and a registration request unit which makes the registration request to the storage unit of the first base station device.

According to the above configuration, the first base station device does not hand over the mobile station device to the second base station device. Accordingly, it is possible to halt the base station device without greatly affecting the communication with the mobile station device.

(9) According to an aspect of the present invention, there is provided a communication system in which a synchronization channel signal is transmitted from a base station device to a mobile station device, wherein the base station device includes: a synchronization channel control unit which halts generation of the synchronization channel signal; a signal control unit which halts generation of signals other than the synchronization channel signal after the synchronization channel control unit halts generation of the synchronization channel signal; a network control unit which changes pre-stored information of the synchronization channel; and a change-scheduled information notification unit which notifies the mobile station device in communication of the synchronization channel signal information changed by the network control unit and a change time, and the mobile station device includes: an information storage unit which stores information of the base station device; and a communication destination changing unit which changes the base station device information stored in the information storage unit based on the changed synchronization channel signal information at the change time notified of by the base station device.

According to the above configuration, the mobile station device can change the base station device information at the same time as the base station device. Accordingly, the mobile station device can prevent communication disconnection from occurring due to information discrepancy with the base station device.

(10) According to an aspect of the present invention, the change-scheduled information notification unit notifies of the synchronization channel signal information changed by the network control unit and a change time.

According to the above configuration, the other base station device can change the base station device information at the same time as the base station device. Accordingly, a mobile station device acquiring handover information from the other base station device can prevent communication disconnection from occurring due to information discrepancy with the base station device.

(11) According to an aspect of the present invention, there is provided a communication method in which a synchronization channel signal is transmitted from a base station device to a mobile station device, the method including: halting generation of the synchronization channel signal; and halting generation of signals other than the synchronization channel signal after the generation of the synchronization channel signal is halted.

(12) According to an aspect of the present invention, there is provided a communication method in which a synchronization channel signal is transmitted from a base station device to a mobile station device, the method including: halting generation of the synchronization channel signal; changing pre-stored information of the synchronization channel; and notifying the mobile station device in communication of the changed information of the synchronization channel signal and a change time.

(13) According to an aspect of the present invention, there is provided a communication program which causes a computer for a base station device which transmits a synchronization channel signal to a mobile station device to execute: halting generation of the synchronization channel signal; and halting generation of signals other than the synchronization channel signal after the generation of the synchronization channel signal is halted.

(14) According to an aspect of the present invention, there is provided a communication program which causes a computer for a base station device which transmits a synchronization channel signal to a mobile station device to execute: halting generation of the synchronization channel signal; changing pre-stored information of the synchronization channel; and notifying the mobile station device in communication of the changed information of the synchronization channel signal and a change time.

Effect of the Invention

According to the present invention, the base station device halts generation of the synchronization channel signal such that communication with a new mobile station device is not generated. Accordingly, it is possible to halt the base station device or change base station device information without greatly affecting communication with the mobile station device.

REFERENCE SYMBOLS 100, 300, 400: base station device, 110, 310, 410: network control unit, 111, 311: communication destination selection unit, 120, 420: radio control unit, 121: synchronization channel control unit, 122: signal control unit, 131 to 133: reception antenna unit, 141 to 143: reception unit, 171 to 173: transmission unit, 161 to 163: transmission antenna unit, 171 to 173: transmission unit, 181: data modulation unit, 182: control signal modulation unit, 183: synchronization signal generation unit, 184: multiplexing and modulation processing unit, 185: D/A conversion unit, 186: transmission analog circuit unit, 200, 500: mobile station device, 201: reception antenna unit, 202: reception analog circuit unit, 203: A/D conversion unit, 204: synchronization unit, 205: GI removal unit, 206: S/P conversion unit, 207: FFT unit, 208: propagation channel estimation and compensation unit, 209: demodulation and decoding unit, 210: MAC unit, 221: modulation unit, 222: IFFT unit, 223: P/S conversion unit, 224: GI addition unit, 225: D/A conversion unit, 226: transmission analog circuit unit, 227: transmission antenna unit, 2041 to 2043: correlator, 2044 to 2046: buffer, 2047: sector and timing detector, 2091: input selector, 2092: control signal demodulation and decoding unit, 2093: data signal demodulation and decoding unit, 2094: S-SCH demodulation and decoding unit, 2095: output selector, 412: change-scheduled information notification unit, 533: information changing unit

BEST MODE FOR CARRYING OUT THE INVENTION

First Embodiment

Figure 1:
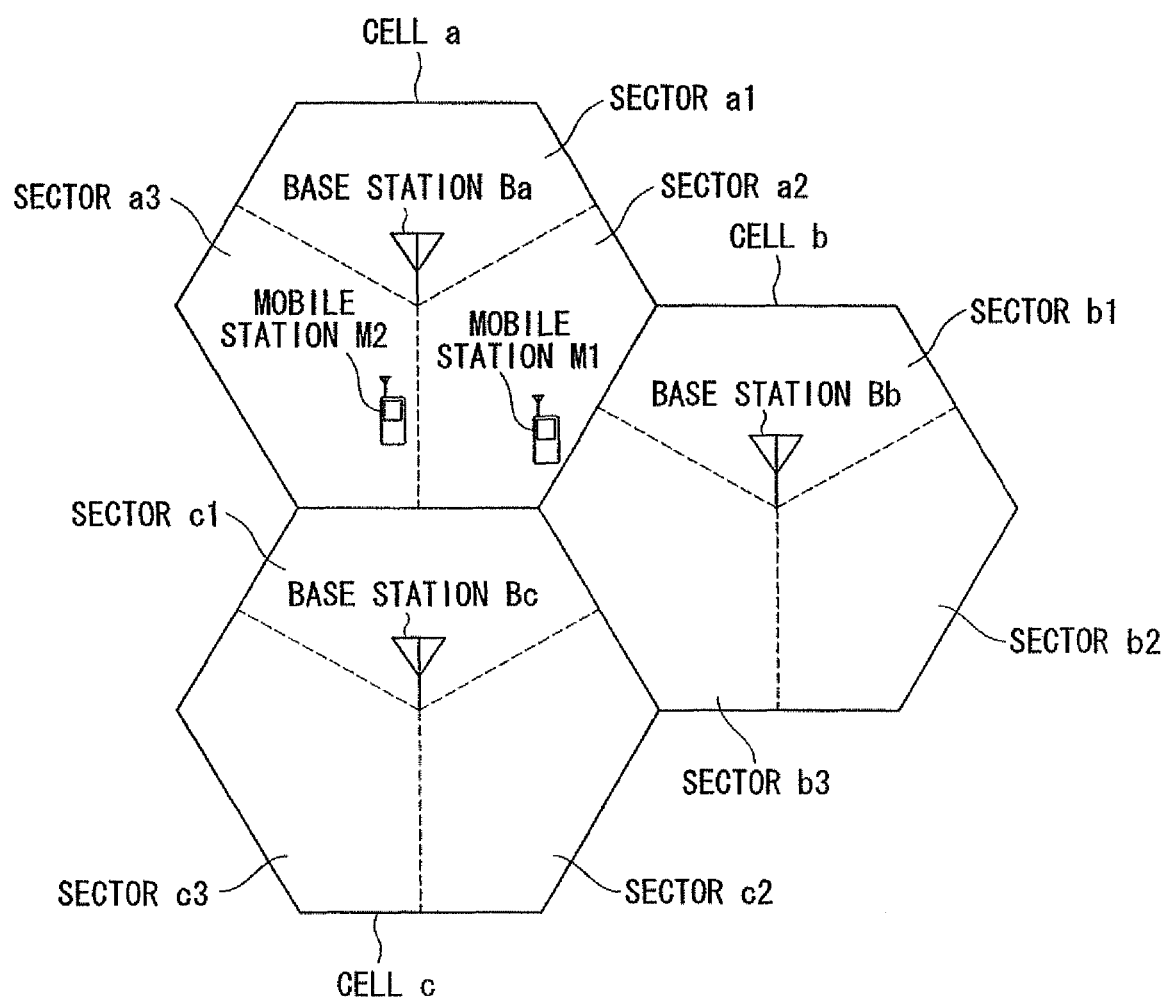
FIG. 1 illustrates a relationship between base station devices and communication coverages according to a first embodiment of the present invention.

Hereinafter, embodiments of the present invention will be described in detail with reference to the accompanying drawings. FIG. 1 is a conceptual diagram showing communication areas of base station devices in the present embodiment. Base station devices Ba to Bc have cells a to c as communication coverages, respectively, and the cells a to c have three sectors a1 to a3, sectors b1 to b3, and sectors c1 to c3, respectively. However, the present invention is not limited thereto and a cell may have any number of sectors. Alternatively, a cell may not be divided into sectors.

Here, the sector a1, the sector b1, and the sector c1 are collectively referred to as sector 1 (with sector number "1"). Further, the sector a2, the sector b2, and the sector c2 are collectively referred to as sector 2 (with sector number "2"), and the sector a3, the sector b3, and the sector c3 are collectively referred to as sector 3 (with sector number "3").

The base station devices Ba to Bc transmit signals to the sectors of the cells a to c. A mobile station device M1 present in the sector a2 of the cell a performs communication in synchronization with a signal for the sector a2 transmitted by the base station device Ba. A mobile station device M2 present in the sector a3 of the cell a performs communication in synchronization with a signal for the sector a3 transmitted by the base station device Ba.

Figure 2:
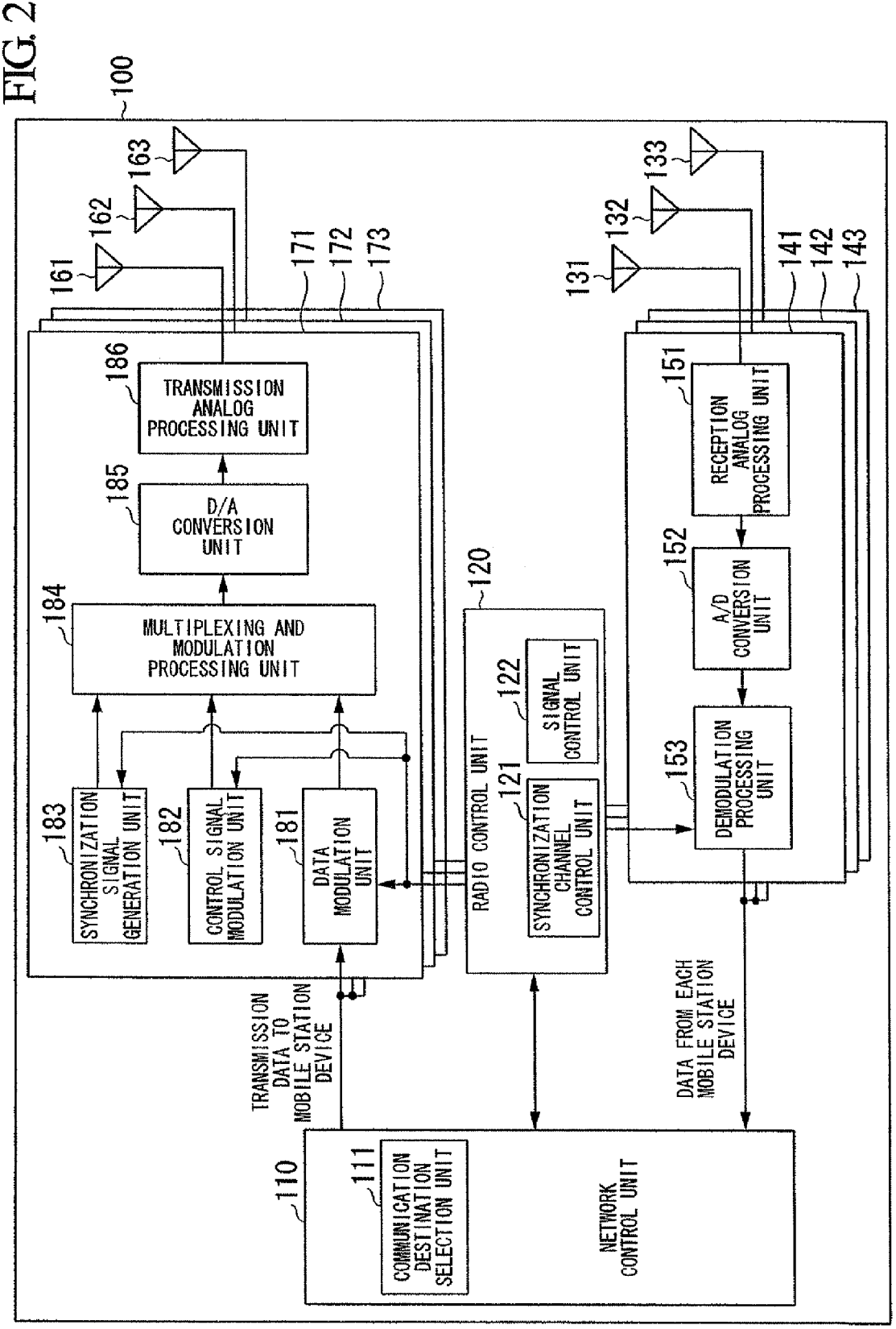
FIG. 2 is a block diagram of the base station device according to the first embodiment of the present invention.

Hereinafter, a base station device 100 (the base station device Ba, Bb or Bc) that communicates with a mobile station device 200 (the mobile station device M1 or M2) will be described with reference to FIG. 2. FIG. 2 is a schematic block diagram showing a configuration of the base station device 100 according to the first embodiment. The base station device 100 includes a network control unit 110, a radio control unit 120, reception antenna units 131 to 133, reception units 141 to 143, transmission units 171 to 173, and transmission antenna units 161 and 163.

Each of the reception units 141 to 143 includes a reception analog circuit unit 151, an A/D conversion unit 152, and a demodulation processing unit 153. The reception units 141 to 143 receive signals from the mobile station devices in sectors 1 to 3 via the corresponding reception antenna units 131 to 133. For example, in the case of the base station device Ba in FIG. 1, the reception unit 142 receives a signal from the mobile station device M1 in the sector a2 via the reception antenna unit 132, and the reception unit 143 receives a signal from the mobile station device M2 in the sector a3 via the reception antenna unit 133.

Each of the transmission units 171 to 173 includes a data modulation unit 181, a control signal modulation unit 182, a synchronization signal generation unit 183, a multiplexing and modulation processing unit 184, a D/A conversion unit 185, and a transmission analog circuit unit 186. The transmission units 171 to 173 transmit signals to the mobile station devices in sectors 1 to 3 via the corresponding transmission antenna units 161 and 163. For example, in the case of the base station device Ba in FIG. 1, the transmission unit 172 transmits a signal to the mobile station device M1 in the sector a2 via the transmission antenna unit 162, and the transmission unit 173 transmits a signal to the mobile station device M2 in the sector a3 via the transmission antenna unit 163.

The reception antenna units 131 to 133 receive signals from mobile station devices and output the signals to the reception analog circuit units 151 of the corresponding reception units 141 to 143.

The reception analog circuit units 151 convert the signals received by the reception antenna units 131 to 133 into frequency signals for demodulation, and output the frequency signals to the A/D conversion units 152.

The A/D conversion units 152 convert the signals input from the reception analog circuit units 151 into digital signals and output the digital signals to the demodulation processing units 153.

The demodulation processing units 153 demodulate the digital signals input from the A/D conversion units 152 under control of the radio control unit 120, and output data obtained through the demodulation to the network control unit 110.

The network control unit 110 communicates with a high-level network for a handover process, which will be described below, and communicates with a network control unit of another base station device via the network.

The network control unit 110 outputs transmission data for the mobile station device to the data modulation unit 181, and outputs control information for controlling each circuit or the communication with the mobile station device to the radio control unit 120.

In response to a peripheral-cell search request, which will be described below, the communication destination selection unit 111 of the network control unit 110 selects a base station device to which the mobile station device 200 is handed over, and generates a handover command for designating the selected base station device as a handover destination.

The network control unit 110 outputs the generated command to the data modulation unit 181 as transmission data for the mobile station device 200 that makes the peripheral-cell search request.

The radio control unit 120 controls the respective circuits such as the data modulation unit 181, the control signal modulation unit 182, the synchronization signal generation unit 183, and the demodulation processing unit 153 based on the control information input from the network control unit 110, and generates control data for controlling the communication with the mobile station device and outputs the control data to the control signal modulation unit 182.

The synchronization channel control unit 121 of the radio control unit 120 controls the initiation or halt of generation of the synchronization channel signal in the synchronization signal generation unit 183.

The signal control unit 122 of the radio control unit 120 controls the initiation or halt of the modulation process in the data modulation unit 181 and the control signal modulation unit 182 for modulating signals other than a synchronization channel.

The data modulation unit 181 acquires the transmission data to be transmitted to the mobile station device 200 from the network control unit 110. Under control of the radio control unit 120, the data modulation unit 181 modulates the transmission data and outputs a data signal to the multiplexing and modulation processing unit 184.

Under control of the radio control unit 120, the synchronization signal generation unit 183 generates a synchronization channel signal, which will be described below, and outputs the synchronization channel signal to the multiplexing and modulation processing unit 184.

Under control of the radio control unit 120, the control signal modulation unit 182 modulates the control data input from the radio control unit 120 and outputs a control signal to the multiplexing and modulation processing unit 184.

The multiplexing and modulation processing unit 184 performs multiplexing and modulation on the signals input from the data modulation unit 181, the control signal modulation unit 182, and the synchronization signal generation unit 183, and outputs a resultant signal to the D/A conversion unit 185. Specifically, the multiplexing and modulation processing unit 184 performs an inverse fast Fourier transform (IFFT) on the frequency domain signal to obtain a time domain signal, and adds a guard interval (GI).

The D/A conversion unit 185 converts the digital signal input from multiplexing and modulation processing unit 184 to an analog signal and outputs the analog signal to the transmission analog circuit unit 186.

The transmission analog circuit unit 186 converts the analog signal obtained through the D/A conversion into a frequency signal for transmission, and outputs the signal to the corresponding transmission antennas 161 to 163.

The transmission antenna units 161 and 163 transmit the signal input from the transmission analog circuit units 186 to respective mobile stations.

Although one base station manages the three sectors in the present embodiment, the present invention is not limited thereto. For example, the base station may control only one sector, like a small base station such as a Home eNodeB that accommodates only a few people. In this case, the transmission unit 172, the transmission antenna 162, the reception unit 142, and the reception antenna 132 for sector 2; the transmission unit 173, the transmission antenna 163, the reception unit 143, and the reception antenna 133 for sector 3; and part of the radio control unit 110 that controls such components in FIG. 2 are unnecessary.

Figure 3:
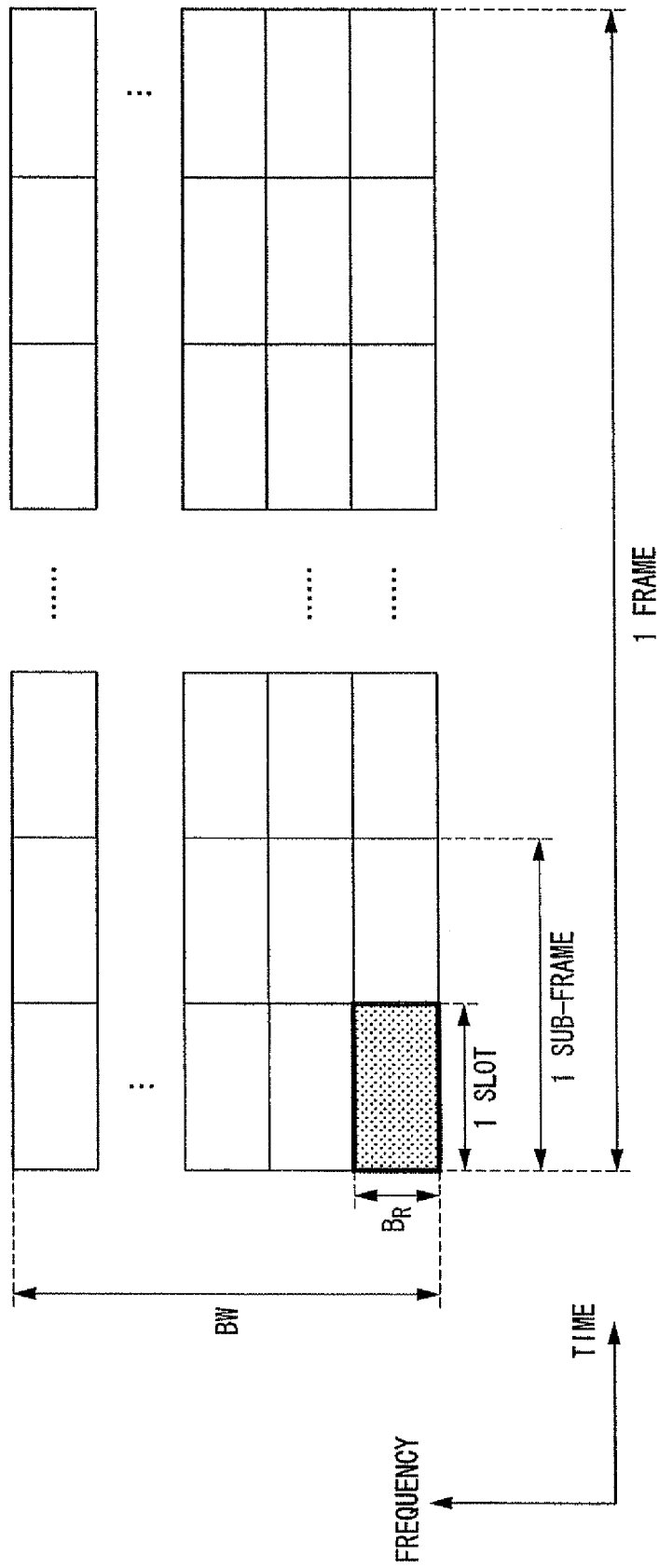
FIG. 3 illustrates a structure of a radio frame according to the first embodiment of the present invention.

Hereinafter, a structure of a radio frame of a signal transmitted by the base station device 100 will be described with reference to FIG. 3. FIG. 3 is a schematic diagram showing the structure of the radio frame in the present embodiment. In FIG. 3, the horizontal axis is a time axis and the vertical axis is a frequency axis. The radio frame consists of a certain frequency domain $B_R$ including a plurality of subcarriers, and a domain including a slot determined as a predetermined transmission time interval, the domains being formed as one unit.

An area formed of the certain frequency domain $B_R$ and one slot is called a resource block for a downlink signal from the base station device 100 to the mobile station device 200, or is called a resource unit for an uplink signal from the mobile station device 200 to the base station device 100. The resource block and the resource unit are separated by a predetermined time interval, and the base station device 100 allocates a symbol to the time interval to arrange a transmission signal.

The transmission time interval that is an integer multiple of one slot is a sub-frame, and a collection of a plurality of sub-frames is a frame. In FIG. 3, one sub-frame consists of two slots. In FIG. 3, BW denotes a system bandwidth. Hereinafter, the certain frequency domain $B_R$ is referred to as a resource block (or resource unit) bandwidth.

For communication using a cellular mobile communication scheme, it is necessary for a mobile station device to be radio-synchronized with a base station device in advance within a cell or a sector that is the communication coverage of the base station device. Accordingly, the base station device transmits a synchronization channel (SCH) having a defined structure and the mobile station device detects the synchronization channel, such that the base station device and the mobile station device are synchronized.

In the present embodiment, the base station device 100 subjects a primary synchronization channel (P-SCH) and a secondary synchronization channel (S-SCH) as a synchronization channel to code division multiplexing at the same timing and transmits a resultant synchronization channel.

Figure 4:
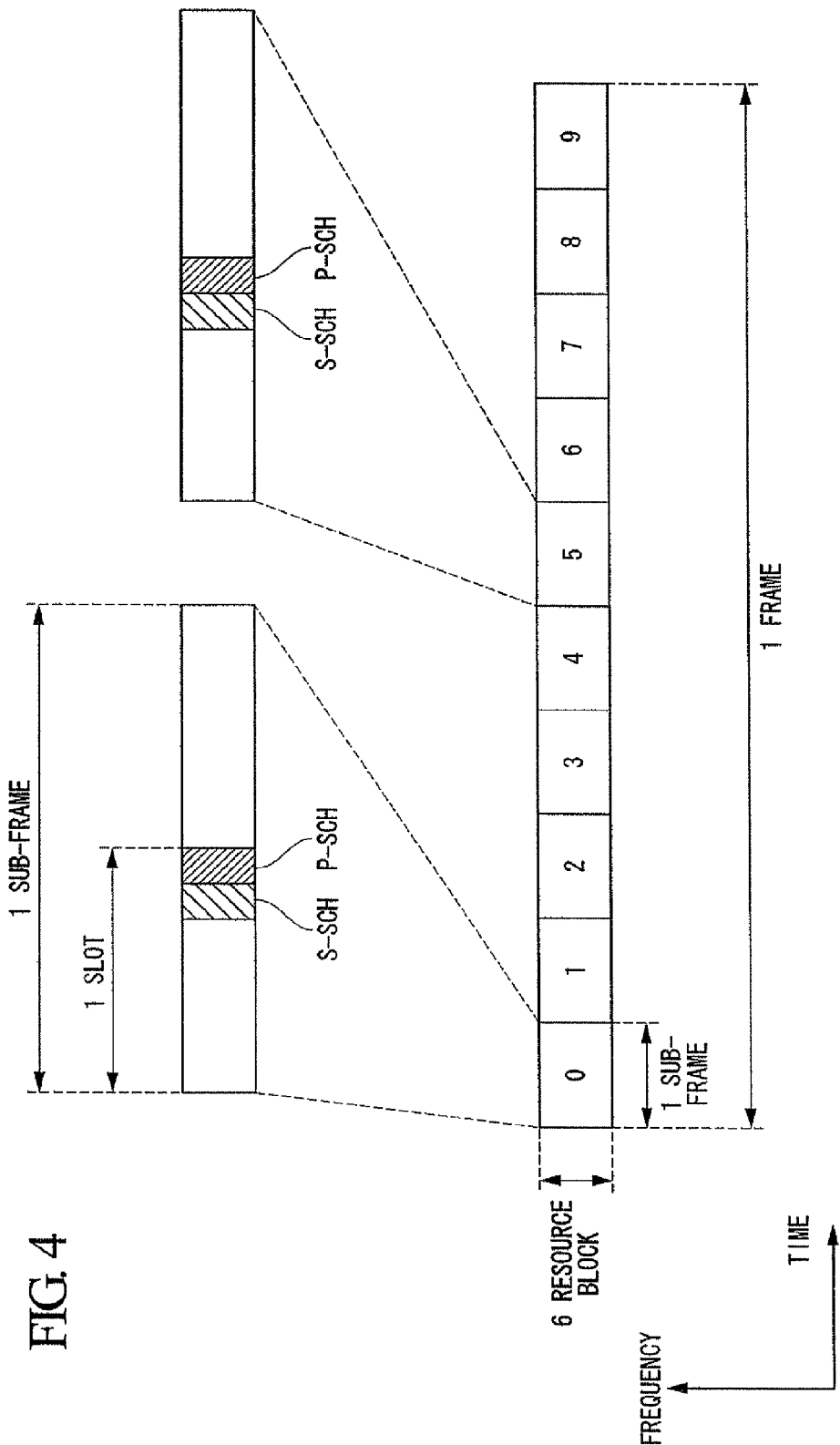
FIG. 4 is a configuration diagram showing an arrangement of a synchronization channel according to the first embodiment of the present invention.

Hereinafter, an arrangement of the synchronization channel will be described with reference to FIG. 4. FIG. 4 is an arrangement diagram showing the arrangement of the synchronization channel in the present embodiment. In FIG. 4, the horizontal axis indicates time and the vertical axis indicates frequency. One frame consists of ten sub-frames (with sub-frame numbers 0 to 9).

The multiplexing and modulation unit 184 of the base station device 100 arranges the P-SCH in a symbol allocated to a last time domain included in each of first slots with sub-frame numbers #0 and #5 in a six-resource block bandwidth at a center of the system bandwidth BW. The multiplexing and modulation unit 184 also arranges the S-SCH in a symbol allocated to a time domain directly before arranging the P-SCH.

A primary synchronization code (PSC) allocated to the P-SCH includes three types of codes: PSC(1), PSC(2), and PSC(3). The base station device 100 allocates codes PSC(1), PSC(2), and PSC(3) to signals transmitted to sector 1, sector 2, and sector 3 of a cell, respectively. The codes PSC(1), PSC(2) and PSC(3) are orthogonal codes.

The same PSC is transmitted to the same sectors of different cells. For example, the base station device Ba, the base station device Bb, and the base station device Bc transmit the same code PSC(1) to the sector a1, the sector b1, and the sector c1, respectively.

Next, a secondary synchronization code (SSC) allocated to the S-SCH will be described. The SSC is unique to the cells, and the base station device 100 arranges the same SSC in the S-SCHs of the sectors in the same cell. For example, the base station device Ba transmits the same SSC to the sector a1, the sector a2, and the sector a3.

Figure 5:
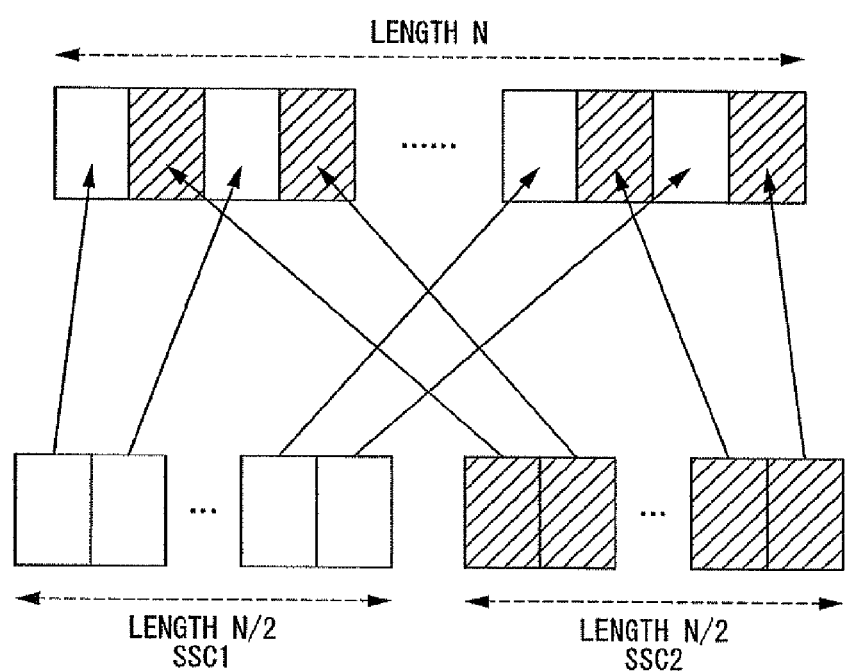
FIG. 5 illustrates a secondary synchronization channel according to the first embodiment of the present invention.

FIG. 5 is a schematic diagram showing a structure of the SSC in the present embodiment. For example, the number N of subcarriers used in the S-SCH is 62, and 31 types of binary codes each having 31 code length (e.g., M-sequence codes) are combined into 2 types (SSC1 and SSC2), such that a maximum of 31 types×31 types=961 information pieces can be made corresponding to the S-SCH. In this case, mapping of SSC1 and SSC2 to a frequency axis may have an interleave-type arrangement in which SSC1 and SSC2 are alternately arranged, as shown in FIG. 5.

Information of the base station device, such as a cell ID that is the identification information of the base station device 100, frame synchronization timing, and the number of antennas of the base station device 100 may correspond to the SSC.

Figure 6:
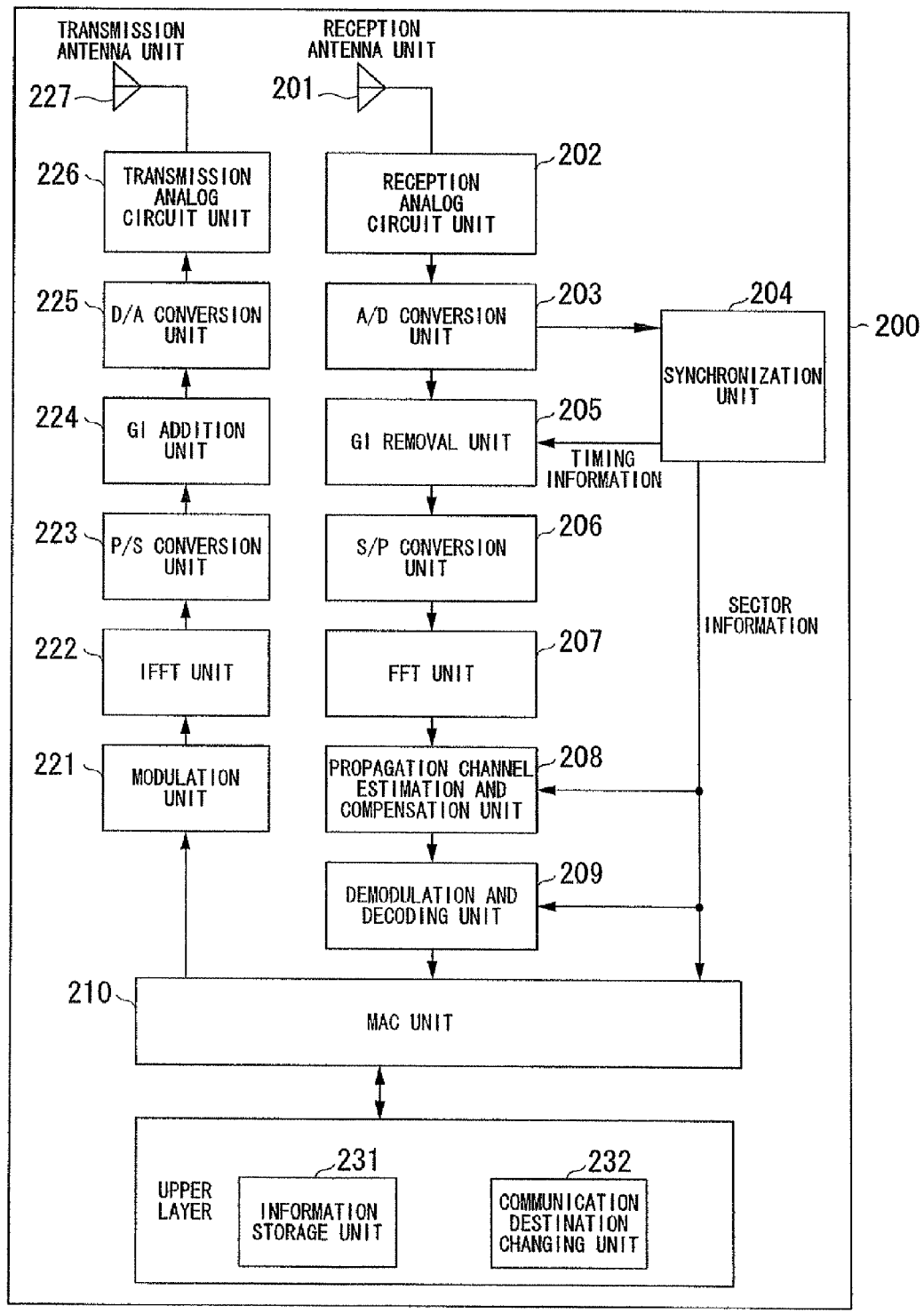
FIG. 6 is a block diagram of a mobile station device according to the first embodiment of the present invention.

Hereinafter, the mobile station device 200 will be described with reference to FIG. 6. FIG. 6 is a schematic block diagram showing a configuration of the mobile station device in the present embodiment. The mobile station device 200 includes a reception antenna unit 201, a reception analog circuit unit 202, an analog/digital (A/D) conversion unit 203, a synchronization unit 204, a GI removal unit 205, an S/P conversion unit 206, a fast Fourier transform (FFT) unit 207, a propagation channel estimation and compensation unit 208, a demodulation and decoding unit 209, a media access control (MAC) unit 210, a modulation unit 221, an IFFT unit 222, a parallel/serial (P/S) conversion unit 223, a GI addition unit 224, a D/A conversion unit 225, a transmission analog circuit unit 226, and a transmission antenna unit 227. The mobile station device 200 further includes an upper layer.

The reception antenna unit 201 receives a signal from the base station and outputs the signal to the reception analog circuit unit 202.

The reception analog circuit unit 202 converts the analog signal received by the reception antenna unit 201 into a frequency signal for demodulation, and outputs the frequency signal to the A/D conversion unit 203.

The A/D conversion unit 203 converts the analog signal input from the reception analog circuit unit 202 into a digital signal and outputs the digital signal to the synchronization unit 204 and the GI removal unit 205.

The synchronization unit 204 identifies a sector based on the digital signal input from the A/D conversion unit 203 to specify the sector number and slot synchronization timing. The synchronization unit 204 also measures the quality of a radio wave received from the base station device. The synchronization unit 204 outputs the specified sector number and the measured radio wave quality to the propagation channel estimation and compensation unit 208, the demodulation and decoding unit 209, and the MAC unit 210, and outputs the specified timing as timing information to the GI removal unit 205. The synchronization unit 204 will be described in detail below.

The GI removal unit 205 removes a guard interval (GI) from the signal input from the A/D conversion unit 203 based on the timing information input from the synchronization unit 204, and outputs a resultant signal to the S/P conversion unit 206.

The S/P conversion unit 206 converts the serial signal input from the GI removal unit 205 into a parallel signal and outputs the parallel signal to the FFT unit 207.

The FFT unit 207 performs an FFT on the time domain signal input from the S/P conversion unit 206 to obtain a frequency domain signal, and outputs the frequency domain signal to the propagation channel estimation and compensation unit 208.

The propagation channel estimation and compensation unit 208 specifies a PSC used for propagation channel estimation from among stored PSCs based on the sector number input from the synchronization unit 204. The propagation channel estimation and compensation unit 208 performs propagation channel compensation from a phase difference and an amplitude difference between the specified PSC and the PSC included in the signal input from the FFT unit 207, and outputs a resultant signal to the demodulation and decoding unit 209. Further, the propagation channel estimation and compensation unit 208 may obtain an SSC from a combination between the stored SSC1 and SSC2, and may perform propagation channel compensation from a phase difference and an amplitude difference between the SSC and the SSC included in the signal input from the FFT unit 207.

The demodulation and decoding unit 209 demodulates and decodes a control signal, a data signal, and a synchronization channel signal included in the signal input from the propagation channel estimation and compensation unit 208 based on the sector number output from the synchronization unit 204, and outputs a resultant signal to the MAC unit 209. The demodulation and decoding unit 209 will be described in detail below.

The signal from the demodulation and decoding unit 209 is output to the upper layer of the mobile station device 200 via the MAC unit 209.

An information storage unit 231 stores the sector number input from the synchronization unit 204 and the information included in the SSC input from the MAC unit 210, as sector information. Further, when there is a change in the pre-stored identification information of the base station device, the information storage unit 231 changes the information. Examples of the identification information of the base station device include a cell ID, a scramble code, and a frame synchronization timing.

The upper layer specifies a base station device in communication, and generates transmission data based on the identification information of the base station device stored in the information storage unit 231. The upper layer outputs the transmission data for the selected base station to the MAC unit 210.

When the handover command generated by the network control unit 110 of the base station device 200 is input, a communication destination changing unit 232 performs a handover process, which will be described below.

The transmission data from the upper layer is input to the modulation unit 221 via the MAC unit 210.

The modulation unit 221 modulates the transmission data input from the MAC unit 210 and outputs resultant data to the IFFT unit 222.

The IFFT unit 222 converts a frequency domain signal output by the modulation unit 221 into a time domain signal, and outputs the time domain signal to the P/S conversion unit 223.

The P/S conversion unit 223 converts the parallel signal output from the IFFT unit 222 into a serial signal and outputs the serial signal to the GI addition unit 224.

The GI addition unit 224 adds a guard interval (GI) to the signal output from the P/S conversion unit 223, and outputs a resultant signal to the D/A conversion unit 225.

The D/A conversion unit 225 converts the digital signal output from the GI addition unit 224 to an analog signal, and outputs the analog signal to the transmission analog circuit unit 226.

The transmission analog circuit unit 226 converts the analog signal into a frequency signal for transmission and outputs the frequency signal to the transmission antenna 227.

The transmission antenna unit 227 transmits the signal input from the transmission analog circuit unit to the base station device 100.

Figure 7:
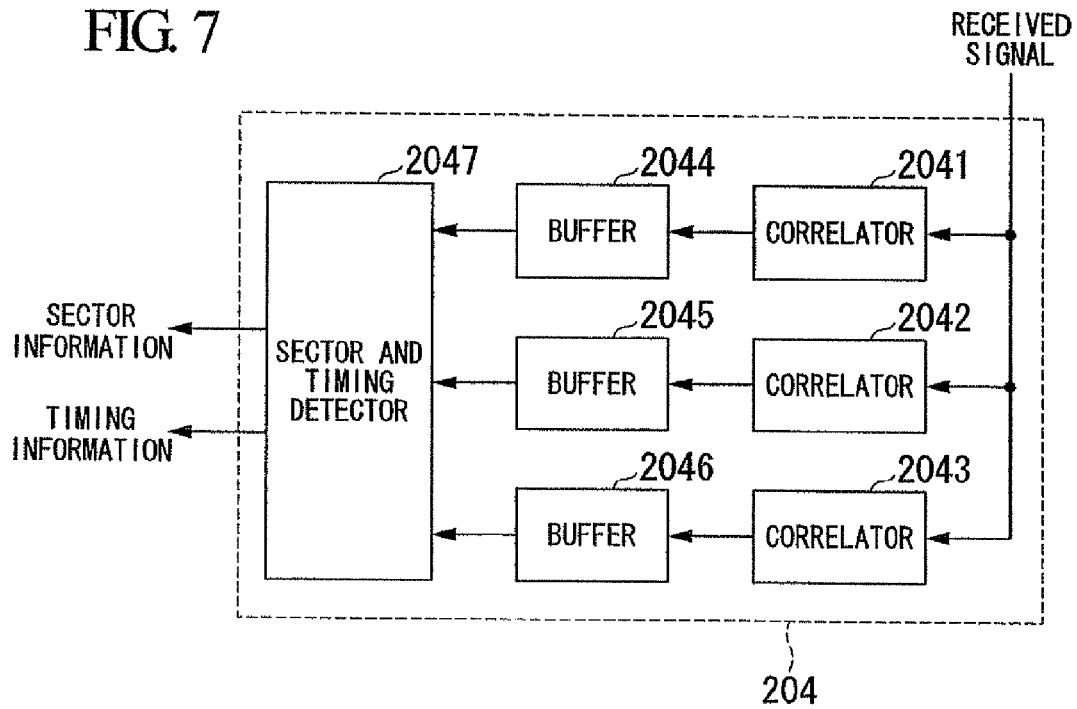
FIG. 7 is a block diagram of a synchronization unit according to the first embodiment of the present invention.

Hereinafter, the synchronization unit 204 will be described in detail with reference to FIG. 7. FIG. 7 is a schematic block diagram showing a configuration of the synchronization unit 204 in the present embodiment. The synchronization unit 204 includes a correlator 2041, a correlator 2042, a correlator 2043, a buffer 2044, a buffer 2045, a buffer 2046, and a sector and timing detector 2047.

The correlators 2041 to 2043 have pre-stored codes PSC(1) to PSC(3), respectively. The correlators 2041 to 2043 take correlations between the stored codes PSC(1) to PSC(3) and the received signal and outputs values of the correlations to the buffers 2044 to 2046. Further, the correlators 2041 to 2043 measure reception quality that is the radio wave quality of the received signal and output the reception quality to the buffers 2044 to 2046, respectively.

The buffers 2044 to 2046 store the correlation values input from the correlators 2041 to 2043 for a predetermined period of time.

The sector and timing detector 2047 specifies a time and a PSC type in which the correlation value is maximized, from the correlation values stored in the buffers 2044 to 2046, and uses the specified PSC type and the specified time as the sector number of the base station with which the mobile station device is synchronized, and a slot timing. Specifically, in the mobile station device M1 of FIG. 1, the correlation with the code PSC(2) is maximized, and in the mobile station device M2, the correlation with the code PSC(3) is maximized (hereinafter, referred to as a PSC identification process).

The sector and timing detector 2047 outputs the sector number and the reception quality as sector information and outputs the timing as timing information.

Figure 8:
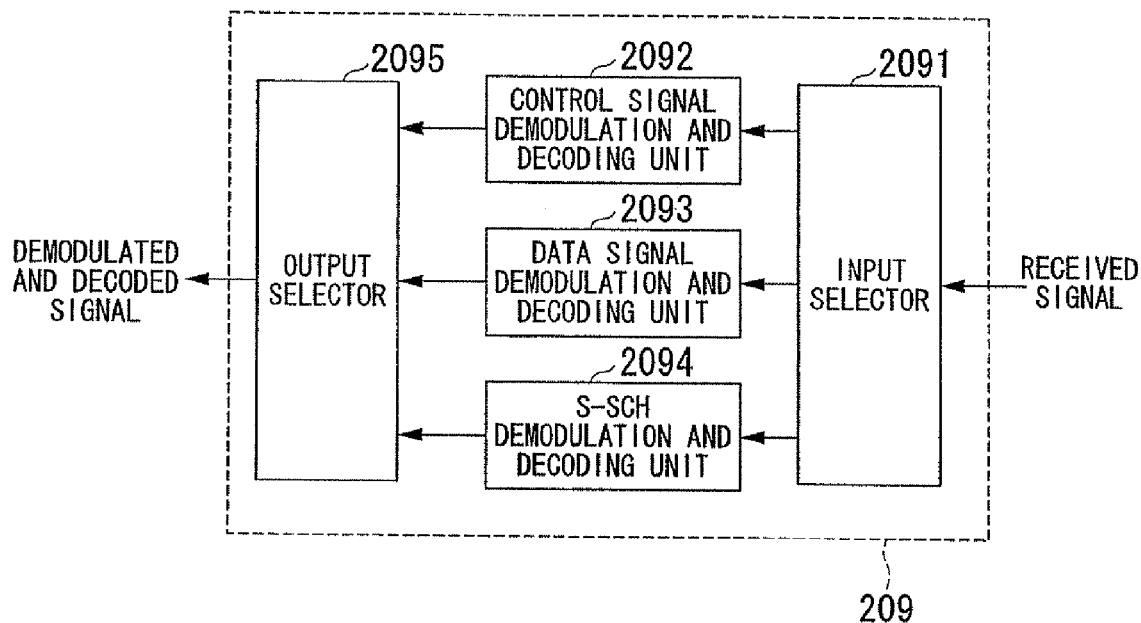
FIG. 8 is a block diagram of a demodulation and decoding unit according to the first embodiment of the present invention.

Hereinafter, the demodulation and decoding unit 209 will be described with reference to FIG. 8. FIG. 8 is a schematic block diagram showing a configuration of the demodulation and decoding unit 209 in the present embodiment. The demodulation and decoding unit 209 includes an input selector 2091, a control signal demodulation and decoding unit 2092, a data signal demodulation and decoding unit 2093, an S-SCH demodulation and decoding unit 2094, and an output selector 2095.

The input selector 2091 performs a demodulation process or a decoding process on the received signal according to the type of the received signal, and outputs a resultant signal to the control signal demodulation and decoding unit 2092, the data signal demodulation and decoding unit 2093, and the S-SCH demodulation and decoding unit 2094.

The control signal demodulation and decoding unit 2092 performs a demodulation process or a decoding process on the control signal included in the signal input from the input selector 2091 and outputs a resultant signal to the output selector 2095.

The data signal demodulation and decoding unit 2093 performs a demodulation process or a decoding process on the data signal included in the signal input from the input selector 2091, and outputs a resultant signal to the output selector 2095.

The S-SCH demodulation and decoding unit 2094 performs a demodulation process or a decoding process on the S-SCH signal included in the signal input from the input selector 2091, and outputs a resultant signal to the output selector 2095. Specifically, the S-SCH demodulation and decoding unit 2094 has pre-stored codes SSC1 and SSC2. The S-SCH demodulation and decoding unit 2094 performs an identification process on the synchronization channel S-SCH signal included in the signal input from the input selector 2091 using the codes SSC1 and SSC2, and acquires information such as the cell ID of the base station device 100, the frame timing, and the transmission antenna number from a combination of the codes SSC1 and SSC2 as the result of the process.

The output selector 2095 outputs the signal input from the control signal demodulation and decoding unit 2092, the signal input from the data signal demodulation and decoding unit 2093, and the signal input from the S-SCH demodulation and decoding unit 2094 as a demodulated and decoded signal to the MAC unit 210.

Hereinafter, the cell search in the mobile station device 200 in the present embodiment will be described. The cell search is classified into an initial cell search and a peripheral-cell search. In the initial cell search, the mobile station device, after activated, searches for a cell having the highest downlink radio wave quality to enter the cell, and in the peripheral-cell search, the mobile station device searches for a candidate cell that is a handover destination after the initial cell search is performed.

Figure 9:
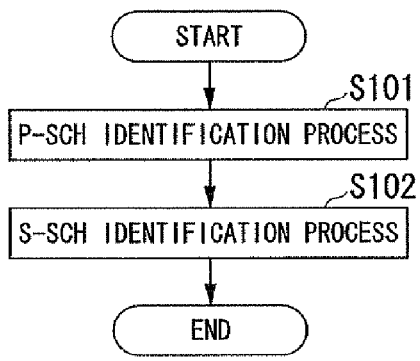
FIG. 9 is a flowchart of an initial cell search according to the first embodiment of the present invention.

The initial cell search will be first described. FIG. 9 is a flowchart illustrating an initial cell search operation in the present embodiment. Here, it is assumed that the base station device 100 and the mobile station device 200 are the base station device Ba and the mobile station device M1 in FIG. 1, respectively.

The reception analog circuit unit 202 of the mobile station device M1 receives a signal containing a P-SCH and an S-SCH from the base station device Ba via the reception antenna unit 201. The received signal is output from the reception analog circuit unit 202 to the synchronization unit 204 via the A/D conversion unit 203. The synchronization unit 204 detects the P-SCH from the received signal and performs a PSC identification process. Here, since the mobile station device M1 is present in the sector a2 in FIG. 1, a correlation value between the received signal and the code PSC(2) is maximized. The synchronization unit 204 acquires the sector information and the slot timing information based on the code PSC(2) (S101).

Meanwhile, the GI removal unit 205 removes the guard interval from the received signal input from the A/D conversion unit 203, based on the slot timing information input from the synchronization unit 204. The signal from the synchronization unit 204 is output to the propagation channel estimation and compensation unit 208 via the S/P conversion unit 206 and the FFT unit 207.

The propagation channel estimation and compensation unit 208 performs propagation channel estimation to measure an estimated propagation channel value from phase and amplitude differences between the P-SCH signal converted into a frequency domain signal and the code PSC(2) identified through the PSC identification process. The propagation channel estimation and compensation unit 208 performs propagation channel compensation on the S-SCH signal from the estimated propagation channel value, and outputs a resultant signal to the demodulation and decoding unit 209.

The S-SCH demodulation and decoding unit 404 of the demodulation and decoding unit 209 demodulates and decodes the S-SCH signal, acquires the information such as the cell ID of the base station device Ba, the frame timing, and the transmission antenna number from the SSC included in the signal, and outputs the acquired information to the upper layer via the MAC unit 210 (S102).

The information storage unit 231 changes the identification information of the base station device based on the information input from the demodulation and decoding unit 209.

Figure 10:
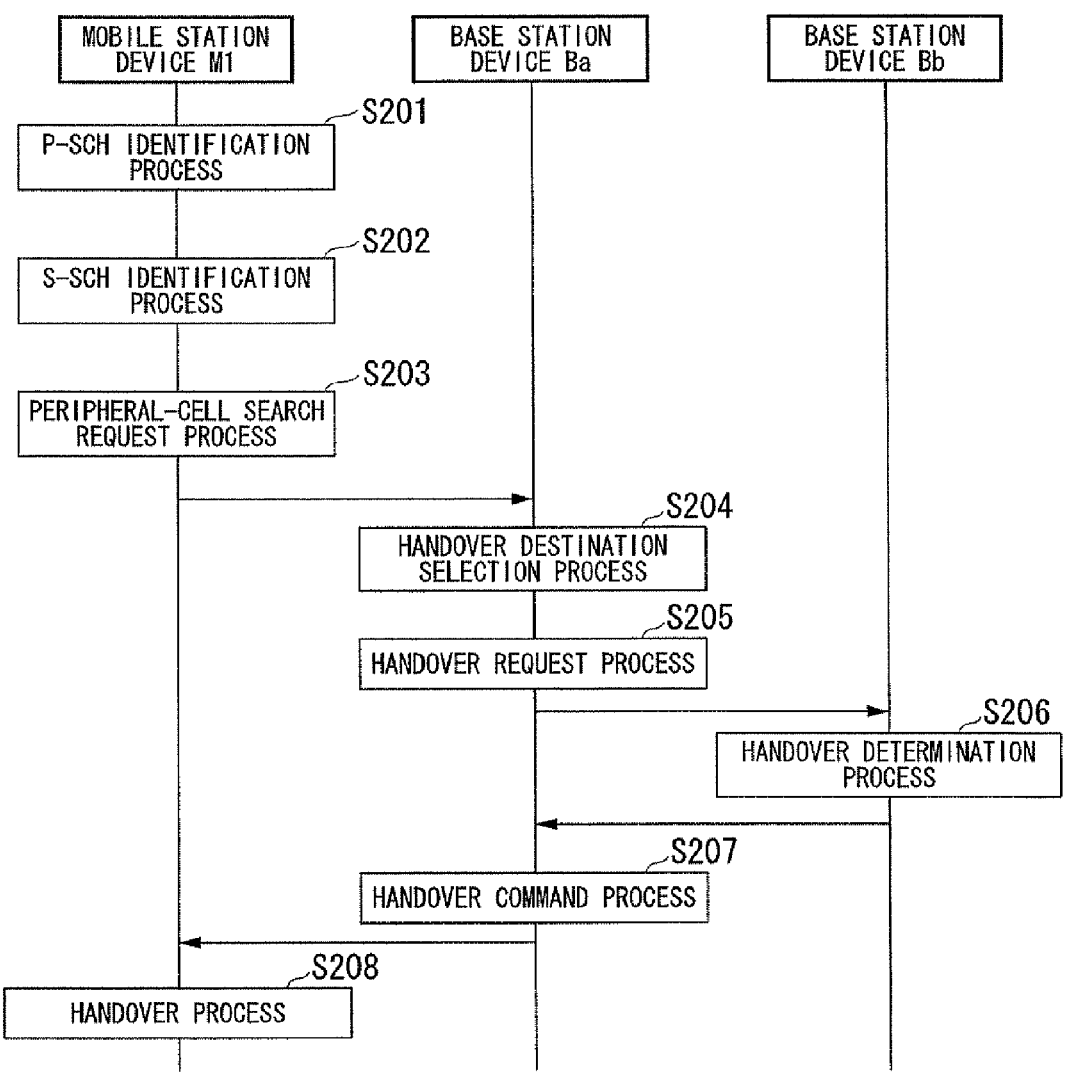
FIG. 10 is a flowchart of a peripheral-cell search according to the first embodiment of the present invention.

Next, the peripheral-cell search and the handover will be described. FIG. 10 is a flowchart illustrating peripheral-cell search and handover operations in the present embodiment. Here, it is assumed that the base station device 100 is the base station device Ba or the base station device Bb in FIG. 1, and the mobile station device 200 is the mobile station device M1 in FIG. 1. It is also assumed that the mobile station device M1 is found in the sector a2 of the cell a in FIG. 1 in the initial cell search.

The reception analog circuit unit 202 of the mobile station device M1 receives a signal including a P-SCH and an S-SCH from each base station device via the reception antenna unit 201. The received signal is output from the reception analog circuit unit 202 to the synchronization unit 204 via the A/D conversion unit 203. The synchronization unit 204 detects the P-SCH from the received signal to perform a PSC identification process.

Here, the synchronization unit 204 performs the PSC identification process on codes PSC(1) and PSC(3) rather than code PSC(2) in order to search for a sector adjacent to the sector in which the mobile station device M1 is present. That is, the mobile station device M1 performs the PSC identification process on signals of the sectors a1, a3, b3, b3, and c1 having a sector number "1" or "3" that surround the sector a2 (with sector number "2") in FIG. 1.

The synchronization unit 204 acquires the sector information and slot timing information of the identified signal based on the code PSC(1) or PSC(3) (S201). Further, the synchronization unit 204 outputs the measured radio wave quality to the MAC unit 210. Meanwhile, the GI removal unit 205 removes the guard interval from the received signal input from the A/D conversion unit 203 based on the slot timing information input from the synchronization unit 204. The signal from the GI removal unit 205 is output to the propagation channel estimation and compensation unit 208 via the S/P conversion unit 206 and the FFT unit 207.

The propagation channel estimation and compensation unit 208 performs propagation channel estimation to measure an estimated propagation channel value from phase and amplitude differences between the P-SCH signal converted into a frequency domain and the code PSC(1) or PSC(3) identified through the PSC identification process. The propagation channel estimation and compensation unit 208 performs propagation channel compensation on the S-SCH signal from the estimated propagation channel value, and outputs a resultant signal to the demodulation and decoding unit 209.

The S-SCH demodulation and decoding unit 2094 of the demodulation and decoding unit 209 demodulates and decodes the S-SCH signal, acquires the information such as the cell ID of the base station device that is a handover destination, the frame timing, and the transmission antenna number from the SSC included in the signal, and outputs the information to the MAC unit 210 (S202).

The MAC unit 210 outputs the radio wave quality input from the synchronization unit 204 and the information input from the demodulation and decoding unit 209 to the upper layer.

The communication destination changing unit 232 outputs a peripheral-cell search request including the information input from the MAC unit 210 as transmission data for the base station device Ba to the MAC unit 210 (S203). The transmission data is transmitted to the base station device Ba via the modulation unit 221, the IFFT unit 222, the P/S conversion unit 223, the GI addition unit 224, the D/A conversion unit 225, the transmission analog circuit unit 226, and the transmission antenna unit 227.

The base station device Ba receives the signal transmitted by the mobile station device M1 from the reception antenna unit 132. The signal is output to the network control unit 110 via the reception analog circuit unit 151, the A/D conversion unit 152, and the demodulation processing unit 153.

The communication destination selection unit 111 of the network control unit 110 determines a need for handover of the mobile station device M1 and a handover destination based on the radio wave quality of the mobile station device M1 and each sector included in the peripheral-cell search request, and a load state of the base station device (S204). For example, when the number of mobile station devices connected to the base station device exceeds a predetermined threshold, the communication destination selection unit 111 determines that the handover is necessary, and selects a sector having the highest quality from the radio wave qualities of the mobile station device M1 and each sector, as a handover destination. Here, it is assumed that the communication destination selection unit 111 selects the sector b3.

The communication destination selection unit 111 stores a relationship between an identifier of the other base station device and communication destination information that is identification information for communicating with the other base station device, and specifies communication destination information from an identifier of the base station device Bb in communication in the selected sector b3. The communication destination selection unit 111 of the base station device Ba communicates with the communication destination selection unit 111 of the base station device Bb, and makes a handover request (S205). Here, the identifier of the base station device is a cell ID.

The communication destination selection unit 111 of the base station device Bb determines whether to permit the handover of the mobile station device M1 based on a load state of the base station device Bb (S206). For example, when the number of mobile station devices connected to the base station device Bb does not exceed a predetermined threshold, the communication destination selection unit 111 permits the handover. When the handover is permitted, the base station device Bb transmits preamble information necessary for the mobile station device and the base station device Bb to communicate with each other, to the base station device Ba.

The communication destination selection unit 111 of the base station device Ba outputs a handover command that is control information instructing to hand over to the base station device Bb and the preamble information received from the base station device Bb, as transmission data for the mobile station device M1, to the data modulation unit 181 (S207).

The transmission data including the handover command output to the data modulation unit 181 is transmitted to the mobile station device M1 via the multiplexing and modulation processing unit 184, the D/A conversion unit 185, the transmission analog circuit unit 186, and the transmission antenna unit 162.

The mobile station device M1 receives the signal including the transmission data and outputs a demodulated and decoded handover command to the upper layer. When the upper layer receives the handover command generated by the network control unit 110 of the base station device 200 and the preamble information, the upper layer generates preamble information for the base station device Bb designated by the handover command, as transmission data (S208). The generated transmission data is transmitted to the base station device Bb designated by the handover command.

Figure 11:
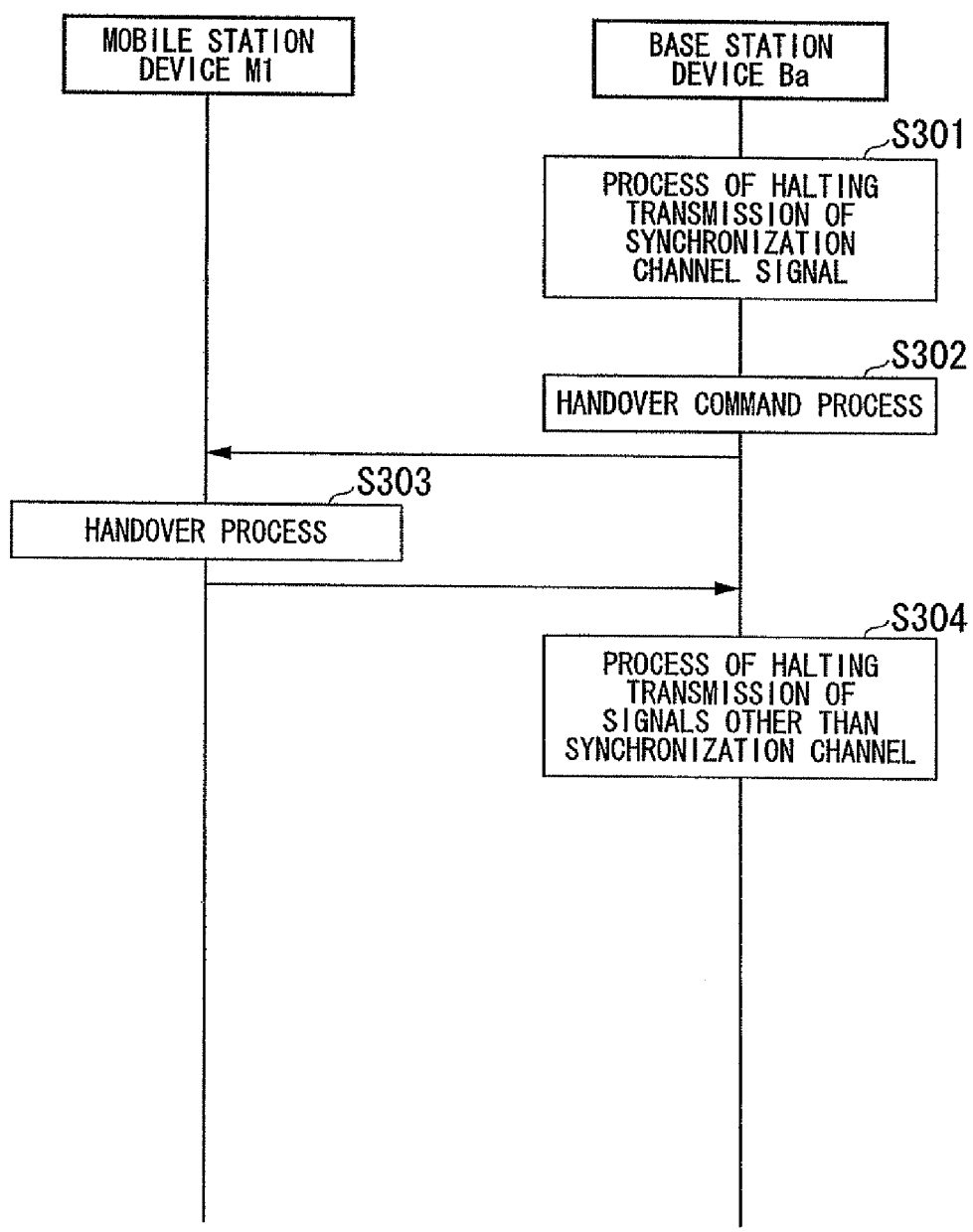
FIG. 11 is a flowchart of an operation in which the base station device halts transmission and reception according to the first embodiment of the present invention.

Hereinafter, an operation in which the base station device 100 halts transmission and reception in the present embodiment will be described. Here, it is assumed that the base station device halting transmission and reception is the base station device Ba in FIG. 1. FIG. 11 is a flowchart illustrating an operation in which the base station device Ba halts transmission and reception.

The synchronization channel control unit 121 of the base station device Ba outputs control information for controlling the synchronization signal generation unit 183 to halt generation of the synchronization channel signal for a sector scheduled to halt transmission and reception, for example, due to maintenance. The synchronization signal generation unit 183 halts generation of synchronization channel signals P-SCH and S-SCH based on the control information input from synchronization channel control unit 121 (S301). Accordingly, even though the mobile station device 200 performs the initial cell search on the sector scheduled to halt transmission and reception, the correlation value of the P-SCH or S-SCH decreases, and accordingly, the mobile station device 200 does not enter the sector scheduled to halt the transmission and reception, in order to be synchronized with another sector having a great correlation value.

Next, the network control unit 110 of the base station device Ba generates a handover command for a mobile station device in communication in the sector scheduled to halt the transmission and reception, and the base station device Ba transmits the handover command to the mobile station device in communication as described above (S302). Upon receipt of the handover command, the mobile station device performs handover (S303). Thus, the base station device Ba can change the mobile station device communicating with the base station device Ba so that the mobile station device can communicate with the other base station device.

When there has been no data from the mobile station device input from the sector reception unit scheduled to halt the transmission and reception, the network control unit 110 of the base station device Ba outputs control information for halting a signal to the radio control unit 120.

The signal control unit 122 of the radio control unit 120 outputs control information for halting a modulation process to the control signal modulation unit 182 and the data modulation unit 181. The control signal modulation unit 182 and the data modulation unit 181 halt control data modulation and transmission data modulation based on the control information input from the signal control unit 122, respectively. When the modulations are halted, generation of signals other than the synchronization channel is halted (S304).

Thus, since the mobile station device is moving to another sector, it is possible to avoid the disconnection of the communication.

Thus, according to the present embodiment, the base station device halts the generation of the synchronization channel signal for the sector halting the transmission and reception, such that the mobile station device that has performed the initial cell search is synchronized with a sector other than the sector halting the transmission and reception and enters the other sector. Accordingly, the base station device halting transmission and reception does not generate communication with the mobile station device based on the initial cell search in the sector halting the transmission and reception.

Further, the base station device halting the transmission and reception transmits the handover command to the mobile station device, such that the mobile station device communicating with the base station device can be handed over to a sector other than the sector halting the transmission and reception. Thus, since the mobile station device is handed over to the other sector, the base station device halting the transmission and reception can halt the transmission and reception without causing the disconnection of the communication with the mobile station device.

Second Embodiment

Hereinafter, a second embodiment of the present invention will be described in detail with reference to the accompanying drawings. In the present embodiment, a mobile station device attempting to hand over to a base station device halting transmission and reception does not hand over to the halting base station device.

Figure 12:
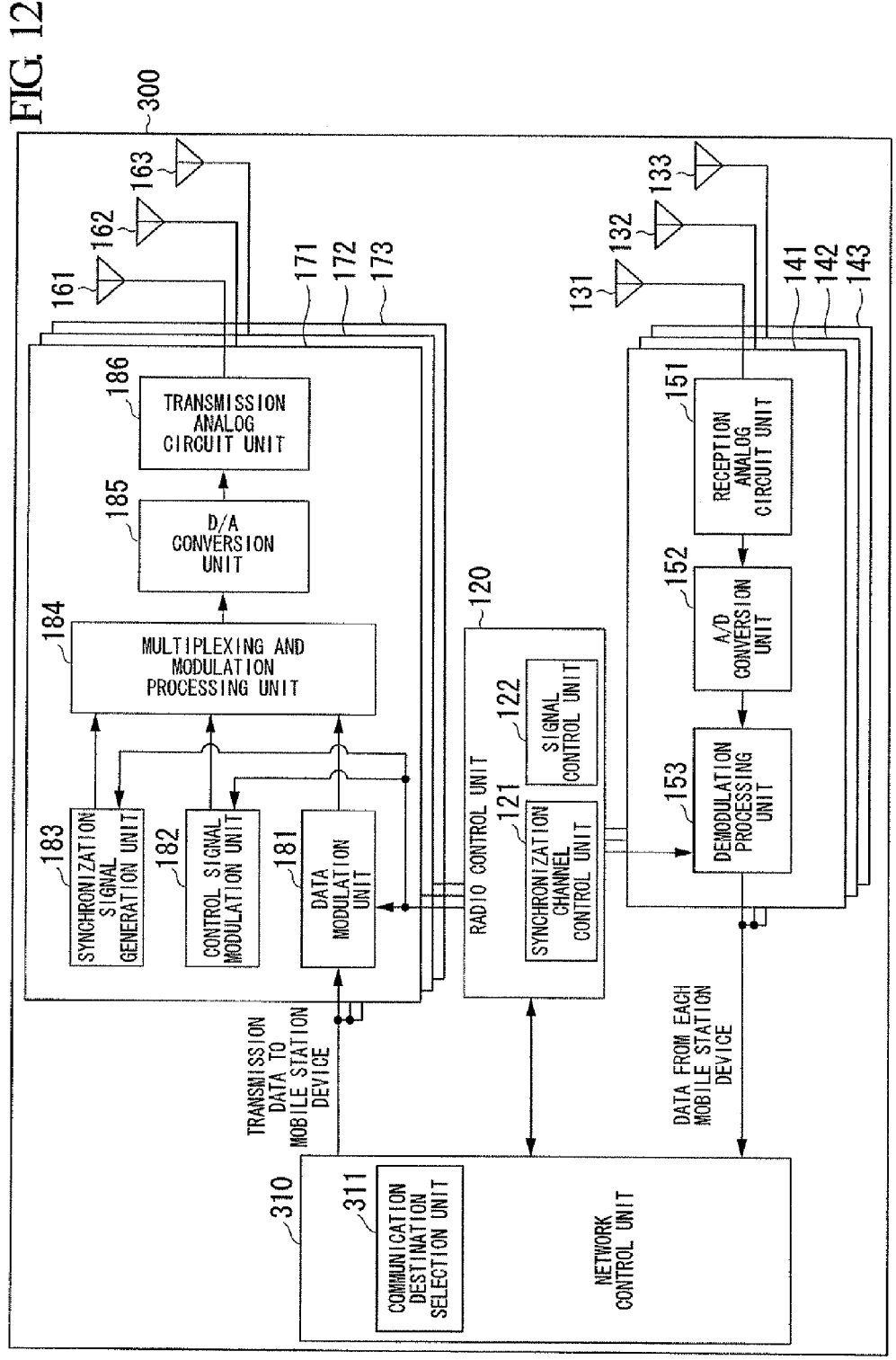
FIG. 12 is a block diagram of a base station device according to a second embodiment of the present invention.

Hereinafter, a base station device 300 (base station device Ba, Bb or Bc) communicating with the mobile station device 200 (mobile station device M1 or M2) will be described with reference to FIG. 12. The present embodiment differs from the first embodiment in that the second embodiment includes a different communication destination selection unit 311. However, since other components have the same functions as those in the first embodiment, a description thereof will be omitted.

The communication destination selection unit 311 selects a handover destination for the mobile station device 200, and generates a handover command corresponding to the handover destination. Further, in the present embodiment, the communication destination selection unit 311 stores identifiers of base station devices not designated as the handover destination (hereinafter, referred to as a blacklist). When the communication destination selection unit 311 selects the handover destination, the communication destination selection unit 311 selects the handover destination, excluding sectors in the identification information in the blacklist.

The communication destination selection unit 311 stores a relationship between the identifier of the other base station device and the communication destination information, and sends a request to the other base station device to register the base station device in a blacklist of the other base station device. Upon receipt of the request to register in the blacklist, the communication destination selection unit 311 stores the identifier of the requesting base station device in the blacklist.

Although the base station device Ba stores the relationship between the identifier of the other base station device and the communication destination information in the present embodiment, the present invention is not limited thereto and another device may store the relationship. In this case, the other device may store a relationship between the identifier of the base station device Ba and an identifier of a base station device adjacent to the base station device Ba, may receive a request to register the blacklist from the base station device Ba, and may transmit the registration request to the base station device adjacent to the base station device Ba.

Since the components of the mobile station device of the present embodiment have the same functions as those in the first embodiment, a description of the functions will be omitted.

Figure 13:
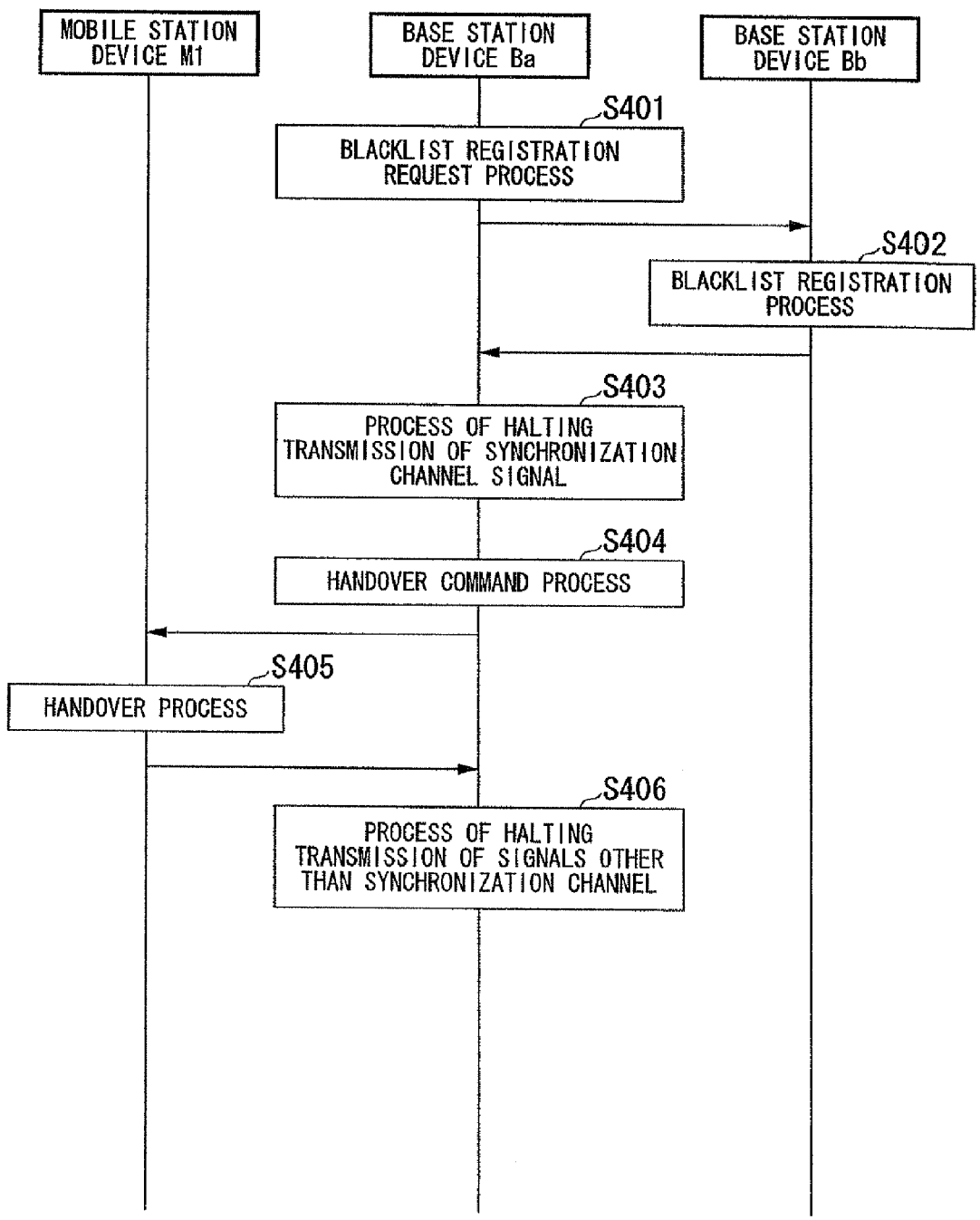
FIG. 13 is a flowchart of an operation in which the base station device halts transmission and reception according to the second embodiment of the present invention.

Hereinafter, an operation in which the base station device 300 halts transmission and reception in the present embodiment will be described. FIG. 13 is a flowchart illustrating the operation. Here, it is assumed that the base station device 300 is the base station device Ba or the base station device Bb in FIG. 1, and the base station device halting the transmission and reception is the base station device Ba.

The communication destination selection unit 311 of the base station device Ba requests the base station device Bb and the base station device Bc to register a blacklist (S401). The communication destination selection units 311 of the base station device Bb and the base station device Bc register an identifier of the base station device Ba in the blacklist (S402). Accordingly, the mobile station device 200 does not select the base station device Ba as the handover destination as a result of searching for peripheral cells of the base station device Bb or the base station device Bc.

The synchronization channel control unit 121 of the base station device Ba outputs control information for halting generation of a synchronization channel signal for a sector scheduled to halt transmission and reception, for example, due to maintenance, to the synchronization signal generation unit 183. The synchronization signal generation unit 183 halts generation of the synchronization channel signals P-SCH and S-SCH based on the control information input from the synchronization channel control unit 121 (S403).

Next, the network control unit 110 of the base station device Ba generates a handover command for the mobile station device in communication in the sector scheduled to halt transmission and reception, and the base station device Ba transmits the handover command to the mobile station device communicating with the base station device as described above (S404). Upon receipt of the handover command, the mobile station device performs handover (S405).

When there has been no data from the mobile station device input from the sector reception unit scheduled to halt the transmission and reception, the network control unit 110 of the base station device Ba outputs control information for halting a signal to the radio control unit 120.

The signal control unit 122 of the radio control unit 120 outputs control information for halting a modulation process to the control signal modulation unit 182 and the data modulation unit 181. The control signal modulation unit 182 and the data modulation unit 181 halt control data modulation and transmission data modulation based on the control information input from the signal control unit 122, respectively. When the modulation is halted, generation of signals other than the synchronization channel is halted (S406).

Thus, according to the present embodiment, the base station device Ba halting the transmission and reception requests the other base station device to exclude the base station device Ba from the handover destination, such that the base station device Ba is excluded from the handover destination based on the peripheral-cell search. The other base station device does not designate the base station device Ba halting transmission and reception as a handover destination for a mobile station device that performs the peripheral-cell search, and does not hand over the mobile station device that has performed the peripheral-cell search to the base station device Ba.

Thus, the base station device Ba halting the transmission and reception does not hand over the mobile station device searching for other base station devices and peripheral-cells to the base station device Ba, and can halt the transmission and reception without greatly affecting the communication of the mobile station device, such as communication disconnection or handover failure.

Third Embodiment

Hereinafter, a third embodiment of the present invention will be described in detail with reference to the accompanying drawings. In the present embodiment, a base station device changes synchronization channel information that the base station device has. Hereinafter, an example in which a PSC or an SSC is changed will be described. However, the present embodiment is not limited thereto, and the PSC and the SSC may be simultaneously changed or other information may be changed.

Figure 14:
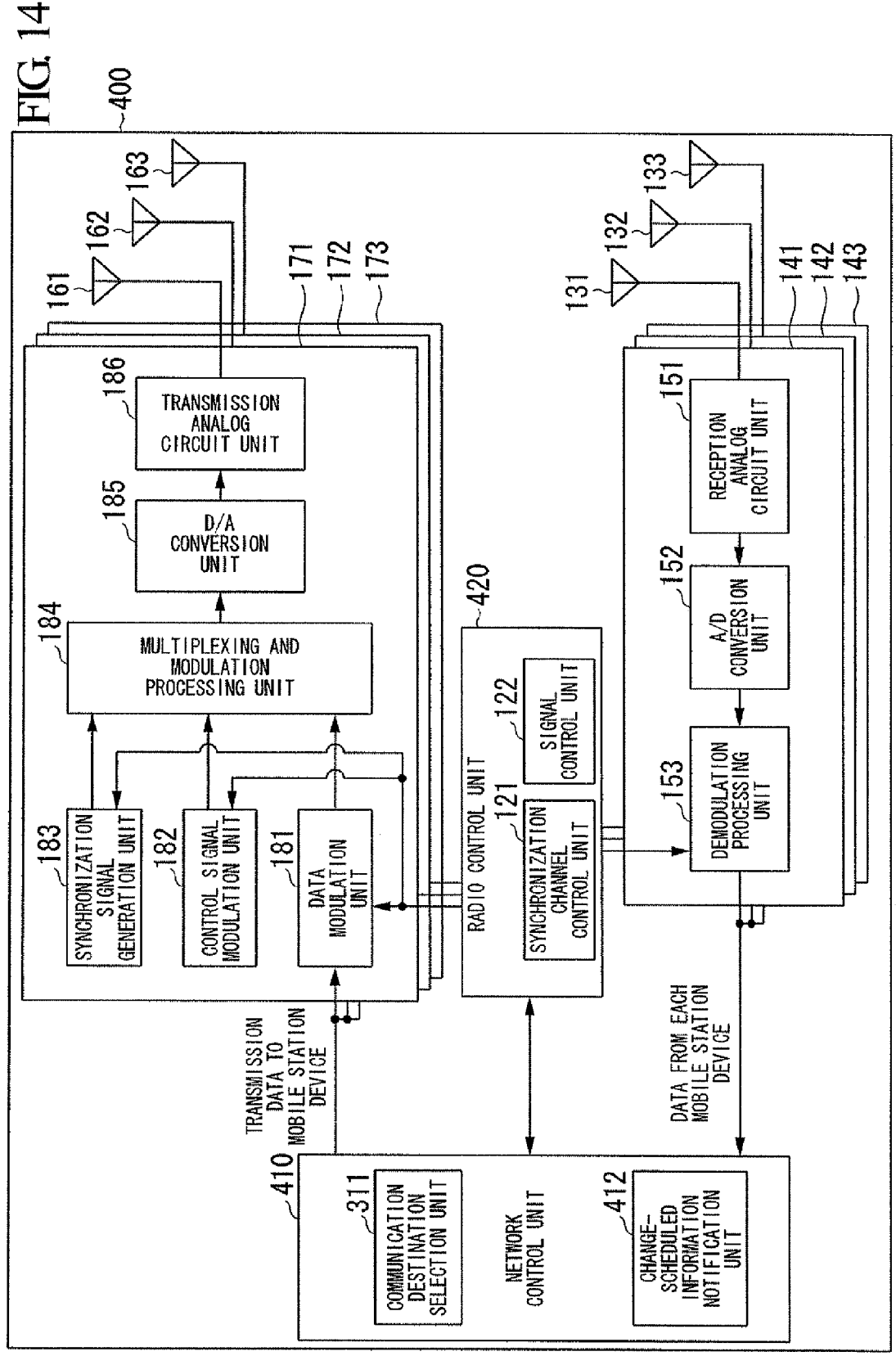
FIG. 14 is a block diagram of a base station device according to a third embodiment of the present invention.

Hereinafter, a base station device 400 (base station device Ba, Bb or Bc) communicating with a mobile station device 500 (mobile station device M1 or M2) will be described with reference to FIG. 14. The present embodiment differs from the second embodiment in that the third embodiment includes a different network control unit 410 and a different radio control unit 420. However, since other components have the same functions as those in the first embodiment, a description thereof will be omitted.

The network control unit 410 outputs transmission data for the mobile station device to the data modulation unit 181, and outputs control information for controlling the respective circuits or the communication with the mobile station device to the radio control unit 420.

The network control unit 410 changes the stored PSC or SSC into PCS' or SSC'. A change-scheduled information notification unit 412 of the network control unit 410 outputs a change-scheduled time T and the PCS' or SSC' as change-scheduled information to the radio control unit 420 prior to changing. Details will be described below.

The radio control unit 420 controls the respective circuits such as the data modulation unit 181, the control signal modulation unit 182, the synchronization signal generation unit 183, and the demodulation processing unit 153 based on the control information input from the network control unit 410, and generates control data for controlling communication with the mobile station device and outputs the control data to the control signal modulation unit 182.

The radio control unit 420 outputs the change-scheduled information input from the change-scheduled information notification unit 412 to the control signal modulation unit 182, and outputs the PCS' or SSC' input from the network control unit 410 to the synchronization signal generation unit 183 at the time T.

Since the synchronization channel control unit 121 and the signal control unit 122 of the radio control unit 420 have the same functions as those in the first embodiment, a description thereof will be omitted.

Figure 15:
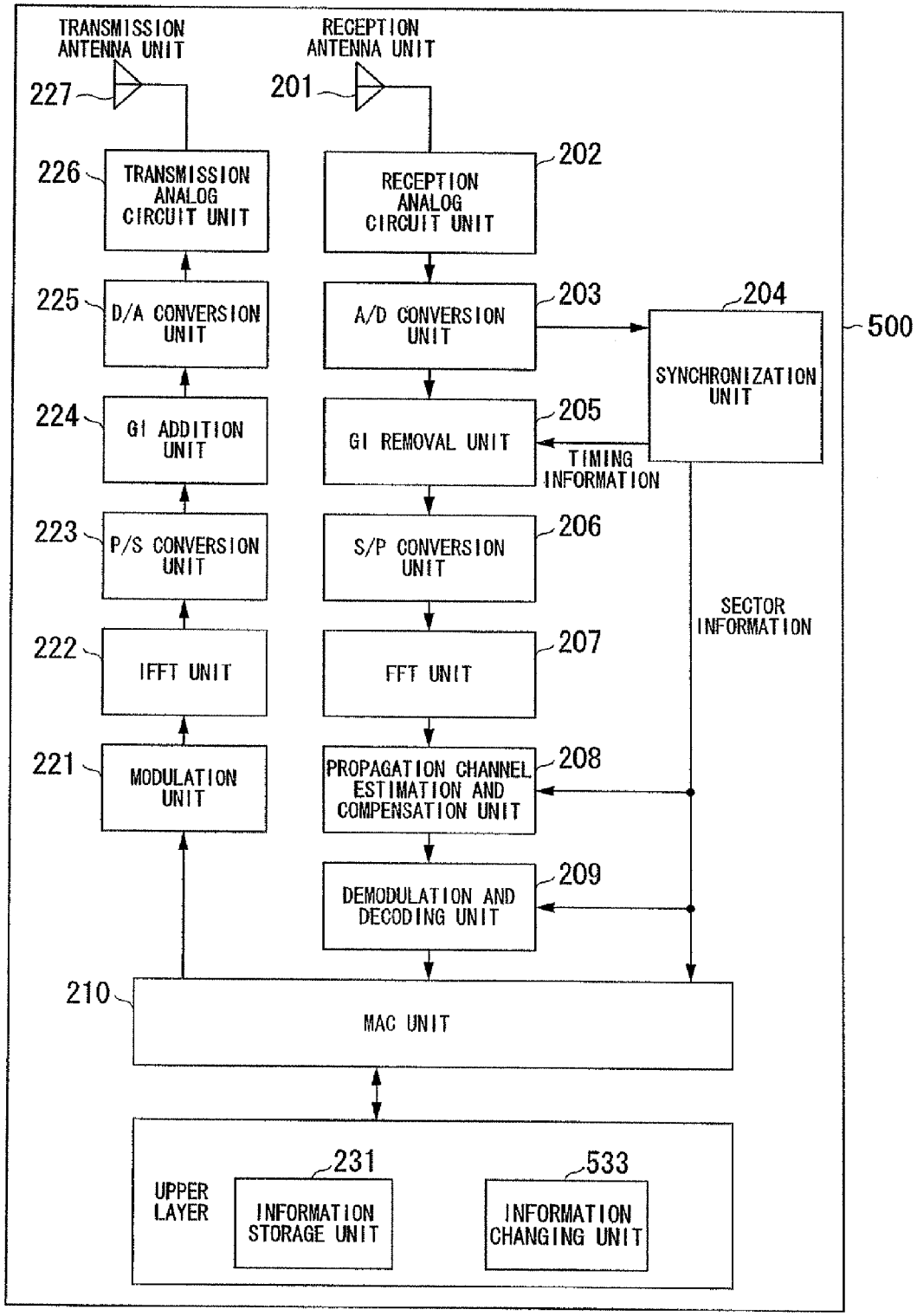
FIG. 15 is a block diagram of a mobile station device according to the third embodiment of the present invention.

Hereinafter, the mobile station device 500 in the present embodiment will be described with reference to FIG. 15. The present embodiment differs from the first embodiment in that the third embodiment includes a different communication destination changing unit 532 and a different information changing unit 533. However, since other components have the same functions as those in the first embodiment, a description thereof will be omitted.

The communication destination changing unit 532 specifies the change-scheduled time T and the PCS' or SSC' from the change-scheduled information received from the base station device 400. The communication destination changing unit 532 changes the PCS' or SSC' stored in the upper layer at the time T.

Figure 16:
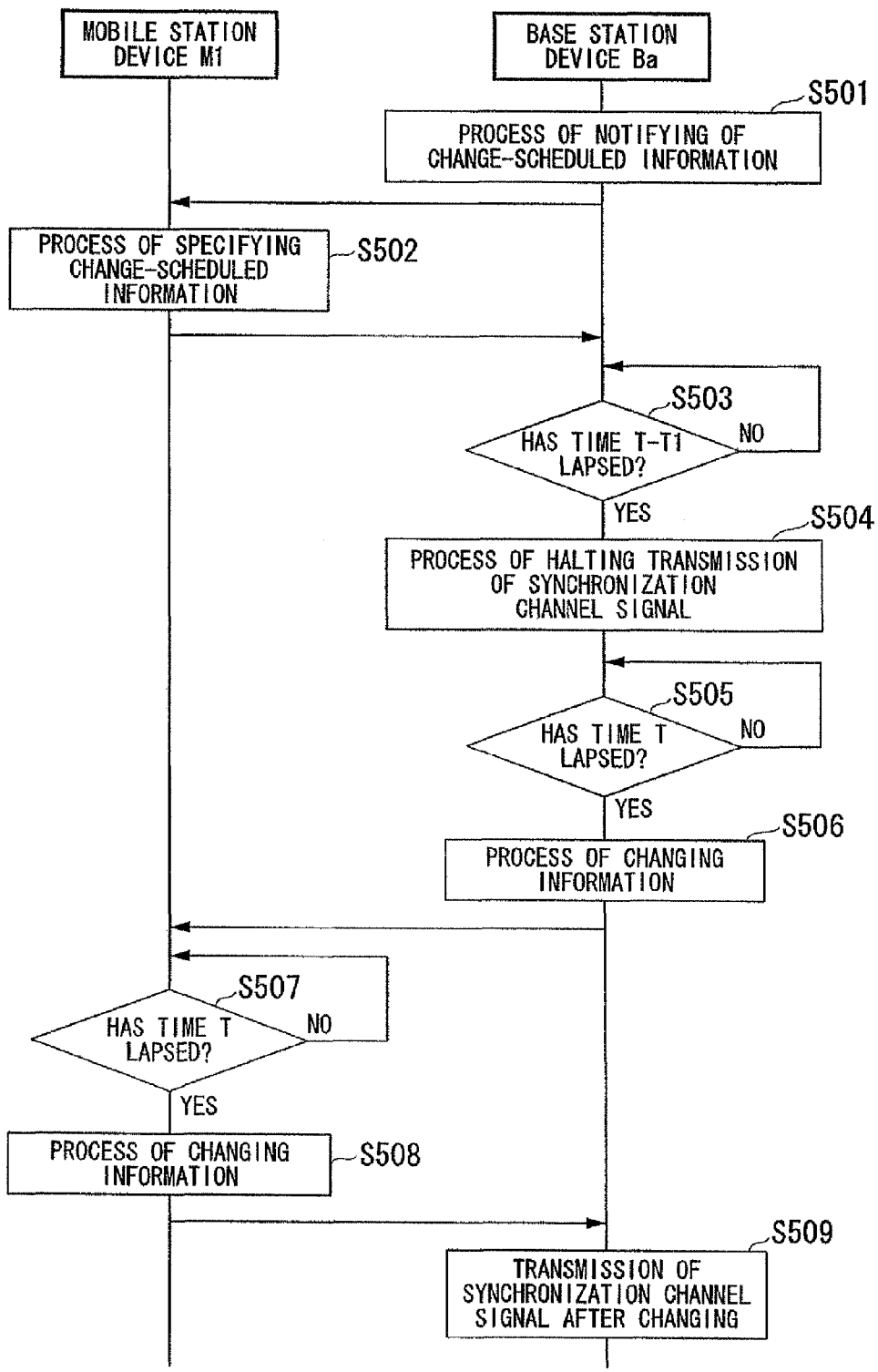
FIG. 16 is a flowchart of an operation in which the base station device changes information according to the third embodiment of the present invention.

Hereinafter, an operation in which the base station device 400 updates its information in the present embodiment will be described. FIG. 16 is a flowchart illustrating the operation. Here, it is assumed that the base station device 400 that changes stored synchronization channel information is the base station device Ba or the base station device Bb in FIG. 1, and the mobile station device 500 that is communicating with the base station device Ba is the mobile station device M1.

The change-scheduled information notification unit 412 of the network control unit 410 in the base station device Ba outputs the change-scheduled time T and the PCS' or SSC' as change-scheduled information to the radio control unit 420 prior to changing. For example, the network control unit 410 converts the code PCS(2) into the code PCS(1) and the cell ID included in the SSC into another cell ID. Here, it is assumed that the change-scheduled time T pre-stored in the network control unit 410 and T1 that will be described below are system frame numbers (SFNs), which are counted every frame, and that T=1000 and T1=200. However, the present invention is not limited thereto, and the time may be a relative time.

The radio control unit 420 outputs the change-scheduled information input from the change-scheduled information notification unit 412 as broadcast channel (BCH) information to the control signal modulation unit 182. The change-scheduled information is transmitted via the control signal modulation unit 182, the multiplexing and modulation processing unit 184, the D/A conversion unit 185, the transmission analog circuit unit 186, and the transmission antenna units 161 and 163 (S501). Meanwhile, the mobile station device M1 receives a signal transmitted by the mobile station device M1 from the reception antenna unit 132. The signal is output to the upper layer via the reception analog circuit unit 202, the A/D conversion unit 203, the GI removal unit 205, the S/P conversion unit 206, the FFT unit 207, the propagation channel estimation and compensation unit 208, the demodulation and complex unit 209, and the MAC unit 210. The information changing unit 533 of the upper layer specifies sector information corresponding to the time T and the PCS' or SSC' included in the change-scheduled information (S502). Here, the information changing unit 533 specifies the changed code PSC(1) from the stored PSC and specifies cell ID information included in the SSC'.

The network control unit 410 determines whether a time T-T1 has lapsed (S503). Specifically, the network control unit 410 determines whether the number of frames has been exceeded 800. When the time T-T1 has lapsed, the network control unit 410 outputs control information for halting P-SCH and S-SCH generation to the radio control unit 420.

The synchronization channel control unit 121 of the base station device Ba outputs control information for halting generation of the synchronization channel signal for a sector scheduled to halt transmission and reception, for example, due to maintenance, to the synchronization signal generation unit 183. The synchronization signal generation unit 183 halts the generation of the synchronization channel signals P-SCH and S-SCH based on the control information input from the synchronization channel control unit 121 (S504).

The network control unit 410 determines whether the time T has lapsed (S505). Specifically, the network control unit 410 determines whether the number of frames has been exceeded 1000.

When the time T has lapsed, the network control unit 410 changes the stored PSC or SSC into PCS' or SSC' (S506).

Meanwhile, the information changing unit 533 of the mobile station device M1 determines whether the time T has lapsed (S507). When the time T has lapsed, the information changing unit 533 changes base station sector information stored in the upper layer (S508). Specifically, the information changing unit 533 changes the sector number into the specified sector number "1" and the cell ID into the changed cell ID.

The network control unit 410 of the base station device Ba outputs the PCS' or SSC' to the radio control unit 420. The radio control unit 420 outputs the PCS' or SSC' to the synchronization signal generation unit 183, which generates the PCS' or SSC' as a signal. Further, when control signal information other than the synchronization channel needs to be changed according to the content of the SSC', the radio control unit 420 outputs the changed control signal to the control signal modulation unit 182. The changed PCS' or SSC' and the control signal are transmitted via the multiplexing and modulation processing unit 184, the D/A conversion unit 185, the transmission analog circuit unit 186, and the transmission antenna units 161 and 163 (S509).

The change-scheduled information notification unit 412 may notify the other base station device of the change-scheduled information. In this case, when the base station device Ba is designated as a changed party by the handover command to instruct handover, the other base station device generates the handover command based on the changed information of the base station device Ba after the time T. Accordingly, it is possible to prevent the handover failure.

Thus, according to the present embodiment, the base station device halts the generation of the synchronization channel signal for the sector halting transmission and reception, such that the mobile station device that has performed the initial cell search is synchronized with a sector other than the sector halting the transmission and reception and enters the sector. Accordingly, the base station device halting the transmission and reception does not generate communication with the mobile station device based on the initial cell search in the sector halting the transmission and reception.

Further, the base station device notifies the mobile station device in communication of the change-scheduled information and the change time, such that the mobile station device can change base station device information at the same time as the base station device. Accordingly, the same information necessary for the communication with the base station device can be maintained in the mobile station device, thereby preventing communication disconnection due to possible information discrepancy.

Although in the first and second embodiments, the network control units 110 and 310 determine that the control information for halting a signal is to be output based on when there has been no data from the mobile station device, the present invention is not limited thereto. For example, the network control units 110 and 310 may determine that the control information is to be output based on when the number of connected mobile station devices is smaller than a predetermined threshold or based on when a predetermined time has lapsed using a timer.

Although the handover destinations are designated for the respective identifiers of halting base station devices in the first and second embodiments, the present invention is not limited thereto. For example, when the sector is halted, the identifier of the base station device and the sector number may be designated. In this case, the blacklist includes the sector number, in addition to the identifier of the base station device.

Although the signal control unit 122 halts the generation of the synchronization channels P-SCH and S-SCH in the respective embodiments, signal generation may be halted at every slot, sub-frame or frame including the P-SCH and the S-SCH. Further, the signal control unit 122 may perform control to decrease the transmission power in a stepwise fashion when halting the generation.

Specifically, the signal control unit 122 controls the synchronization signal generation unit 183 to generate a synchronization channel signal having an amplitude that is decreased in a stepwise fashion. The signal control unit 122 controls the data modulation unit 181 and the control signal modulation unit 182 to decrease the amplitude of a signal of a slot, sub-frame or frame including the synchronization channel signal having the decreased amplitude, and modulate the signal. However, the present invention is not limited thereto, and, for example, the multiplexing and modulation processing unit 184 may decrease the amplitude of an output waveform in a stepwise fashion or the transmission analog circuit unit 186 may decrease the transmission power in a stepwise fashion.

If only the P-SCH and the S-SCH are halted, an amplitude difference with the PSC and SSC stored in the mobile station device increases, causing the mobile station device to measure an erroneously estimated propagation channel value. When the mobile station device performs propagation channel compensation using the measured estimated propagation channel value at every slot, sub-frame, or frame, a signal of the slot, the sub-frame, or the frame is erroneously propagation-channel-compensated.

Accordingly, the base station device decreases the signal transmission power of each slot, sub-frame or frame in a stepwise fashion, such that the mobile station device can perform correct propagation channel estimation and compensation on a signal based on the S-SCH. In particular, when the amplitude is made corresponding to the information, as in quadrature amplitude modulation (QAM), demodulated information can be prevented from being erroneous due to erroneous propagation channel compensation from the amplitude difference.

When the base station device halting the transmission and reception decreases the transmission power of the synchronization channel signal in a stepwise fashion, an adjacent base station device increases a signal transmission power in a stepwise fashion to extend its cell or sector and supplement the communication coverage of the base station device halting the communication. If the synchronization channel signal is suddenly halted, the mobile station device is handed over too late based on the reception quality after the halt, and accordingly, the communication disconnects. Because the base station device decreases the transmission power of the synchronization channel signal in a stepwise fashion, the mobile station device can measure the reception quality in a stepwise fashion and can be handed over to another suitable base station based on the reception quality.

When the communication of the halting base station device is initiated, the adjacent base station device decreases the signal transmission power in a stepwise fashion.

Although the cell search method has been described in the respective embodiments, the present invention is not limited thereto, and, for example, the S-SCH may include information of a cell ID group consisting of a plurality of cell IDs, and the mobile station devices 200 and 500 may specify the plurality of cell IDs. A cell search in which the mobile station devices 200 and 500 measure the quality of a common pilot channel and specify a corresponding cell ID from a pilot channel having the highest quality may be used.

In the above-described embodiments, a program of realizing all or some of the functions of the respective components of the mobile station device and the base station device may be recorded on a computer-readable recording medium, and may be read and executed by the computer system to control the mobile station device or the base station device. The "computer system" mentioned above includes an operating system (OS) or hardware such as peripheral devices.

The "computer-readable recording medium" includes a storage unit, including a portable medium such as a flexible disk, a magnetic optical disk, a ROM, and a CD-ROM, and a hard disk embedded in the computer system. Further, the "computer-readable recording medium" may include a medium for temporarily and dynamically storing programs, like a communication line when a program is transmitted via a network such as the Internet or a communication line such as a telephone line, and a medium for storing programs for a predetermined time, like a volatile memory inside a computer system consisting of a server and a client in that case. The program may be a program for realizing some of the above-described functions. Alternatively, the program may be a program capable of realizing the above-described functions through a combination with a program previously stored in a computer system.

Although the embodiments of the present invention have been described with reference to the accompanying drawings, a concrete configuration is not limited to the foregoing, but various modifications and variations may be made to the present invention without departing from the scope of the present invention.

INDUSTRIAL APPLICABILITY

The present invention can be applied to a base station device, a mobile station device, a radio communication system, and so on for mobile communication, and can halt the base station device or changing base station device information without greatly affecting the communication with the mobile station device.

The invention claimed is:

1. A communication system, the communication system comprising:
    a plurality of mobile station devices;
    a first base station device, the first base station device is configured to manage communication between each mobile station device of said plurality of mobile station devices and the first base station device in at least one sector; and
    a second base station device, the second base station device being provided around the first base station device,
    wherein, in the at least one sector, the first base station device is configured to change from a first state to a second state,
    the first state being a state in which transmission from the first base station device is able to be received by every mobile station device being able to communicate with the first base station device in an initial cell search, and
    the second state being a state in which
        transmission from the first base station device is unable to be received by every mobile station device being able to communicate with the first base station device on the first state in the initial cell search, and
        at least radio transmission powers of synchronization signals used in the initial cell search for the at least one sector from the first base station device is suppressed and/or halted, and
    the first base station device is configured to notify the second base station device of information by which the second base station device is able to recognize the change of the state of the first base station device before the changing from the first state to the second state, and to transmit a handover command to a mobile station device for the mobile station device to perform handover before transmission signals for the at least one sector are suppressed and/or halted.

2. The communication system according to claim 1, wherein
    the change of the state of the first base station device from the first state to the second state is performed after the first base station device notifies the second base station device of the information.

3. The communication system according to claim 1 or 2, wherein
    the second base station device uses the information when the second base station device selects a communication destination of the mobile station device.

4. The communication system according to claim 3, wherein
    the second base station device has a list by which the determination whether a communication destination of the mobile station device is suitable or not is made, and the second base station device updates the list in accordance with the information.

5. The communication system according to claim 4, wherein
    the list includes sector information, the sector information being managed by a base station device provided around the second base station device.

6. A processing method performed by a first base station device managing communication between a plurality of mobile station devices and the first base station device in at least one sector, the processing method comprising:

changing from a first state to a second state,
    the first state being a state in which transmission from the first base station device is able to be received by every mobile station device being able to communicate with the first base station device in an initial cell search, and
    the second state being a state in which
        transmission from the first base station device is unable to be received by every mobile station device being able to communicate with the first base station device on the first state in the initial cell search, and
        at least radio transmission powers of synchronization signals used in the initial cell search for the at least one sector from the first base station device is suppressed and/or halted;
notifying a second base station device of information by which the change of the state of the first base station device is able to be recognized in the second base station device before the changing from the first state to the second state; and
transmitting a handover command to a mobile station device for the mobile station device to perform handover before transmission signals for the at least one sector are suppressed and/or halted.

7. The processing method according to claim 6, wherein
    the change of the state of the first base station device from the first state to the second state is performed after the first base station device notifies the second base station device of the information.

8. The processing method according to claim 6 or 7, wherein
    the second base station device uses the information when the second base station device selects a communication destination of the mobile station device.

9. A processing method performed by a second base station device provided around a first base station device managing communication between a plurality of mobile station devices and the first base station device in at least one sector, wherein, in the at least one sector, when the first base station device is changed from a first state to a second state in case that handover of a mobile station device is initiated by a handover command from the first base station device is performed,
    the first state being a state in which transmission from the first base station device is able to be received by every mobile station device being able to communicate with the first base station device in an initial cell search, and
    the second state being a state in which
        transmission from the first base station device is unable to be received by every mobile station device being able to communicate with the first base station device on the first state in the initial cell search, and
        at least a radio transmission powers of synchronization signals used in the initial cell search for the at least one sector from the first base station device is suppressed and/or halted, the processing method comprising:
receiving, from the first base station device, information by which the second base station device is able to recognize the change of the state of the first base station device before the changing of the first base station device from the first state to the second state; and
using, by the second base station, the information in case that a communication destination of every mobile station device performing handover initiated by the second base station.

10. The processing method according to claim 9, wherein the change of the state of the first base station device from the first state to the second state is performed after the first base station device notifies the second base station device of the information.

11. The processing method according to claims 9 to 10, wherein
the second base station device updates, in accordance with the information, a list by which the determination whether a communication destination of the mobile station device is suitable or not is made.

12. The processing method according to claim 11, wherein the list includes sector information, the sector information being managed by a base station device provided around the second base station device.

13. A first base station device managing communication between a plurality of mobile station devices and the first base station device in at least one sector, the first base station device comprising:
a changing unit configured to change from a first state to a second state,
the first state being a state in which transmission from the first base station device is able to be received by every mobile station device being able to communicate with the first base station device in an initial cell search, and
the second state being a state in which
transmission from the first base station device is unable to be received by every mobile station device being able to communicate with the first base station device on the first state in the initial cell search, and
at least radio transmission powers of synchronization signals used in the initial cell search for the at least one sector from the first base station device is suppressed and/or halted; and
a notifying unit configured to notify a second base station device of information by which the change of the state of the first base station device is able to be recognized in the second base station device before the changing from the first state to the second state, and
at least one transmitting unit configured to transmit a handover command to a mobile station device for the mobile station device to perform handover before transmission signals for the at least one sector are suppressed and/or halted.

14. The first base station device according to claim 13, wherein
the change of the state of the first base station device from the first state to the second state is performed after the first base station device notifies the second base station device of the information.

15. The first base station device according to claim 13 or 14, wherein
the second base station device uses the information when the second base station device selects a communication destination of the mobile station device.

16. The first base station device according to claim 15, wherein
the second base station device uses the information to update a list by which the determination whether a communication destination of the mobile station device is suitable or not is made.

17. A second base station device provided around a first base station device managing communication between a plurality of mobile station devices and the first base station device in at least one sector, wherein, in the at least one sector, when the first base station device is changed from a first state to a second state in case that handover of a mobile station device is initiated by a handover command from the first base station device is performed,
the first state being a state in which transmission from the first base station device is able to be received by every mobile station device being able to communicate with the first base station device in an initial cell search, and
the second state being a state in which
transmission from the first base station device is unable to be received by every mobile station device being able to communicate with the first base station device on the first state in the initial cell search, and
at least radio transmission powers of synchronization signals used in the initial cell search for the at least one sector from the first base station device is suppressed and/or halted, the second base station device comprising:
a receiving unit configured to receive, from the first base station device, information by which the second base station device is able to recognize the change of the state of the first base station device before the changing of the first base station device from the first state to the second state; and
a selecting unit configured to use the information in case that a communication destination of every mobile station device performing handover initiated by the second base station devices, is selected.

18. The second base station device according to claim 17, wherein
the change of the state of the first base station device from the first state to the second state is performed after the first base station device notifies the second base station device of the information.

19. The second base station device according to claim 17 or 18, wherein
a list by which the determination whether a communication destination of the mobile station device is suitable or not is made is updated in accordance with the information.

20. The second base station device according to claim 19, wherein
the list includes sector information, the sector information being managed by a base station device provided around the second base station device.

* * * * *